(12) United States Patent
Kakuya et al.

(10) Patent No.: US 8,464,687 B2
(45) Date of Patent: Jun. 18, 2013

(54) CONTROL DEVICE FOR COMPRESSED SELF-IGNITION TYPE INTERNAL COMBUSTION ENGINE

(75) Inventors: Hiromu Kakuya, Hitachinaka (JP); Kengo Kumano, Hitachinaka (JP); Shiro Yamaoka, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 44 days.

(21) Appl. No.: 13/318,558

(22) PCT Filed: Apr. 21, 2010

(86) PCT No.: PCT/JP2010/057076
§ 371 (c)(1),
(2), (4) Date: Nov. 2, 2011

(87) PCT Pub. No.: WO2010/131555
PCT Pub. Date: Nov. 18, 2010

(65) Prior Publication Data
US 2012/0055445 A1    Mar. 8, 2012

(30) Foreign Application Priority Data

May 12, 2009  (JP) .................................. 2009-115114

(51) Int. Cl.
| F02D 41/02 | (2006.01) |
| F02B 11/00 | (2006.01) |
| F02B 23/10 | (2006.01) |
| F02M 25/07 | (2006.01) |

(52) U.S. Cl.
USPC .......................................... 123/305; 701/103

(58) Field of Classification Search
USPC ................... 123/295, 305; 701/103, 104, 108, 701/111
See application file for complete search history.

(56) References Cited

U.S. PATENT DOCUMENTS

| 6,332,448 B1 | 12/2001 | Ilyama et al. |
| 6,390,054 B1 * | 5/2002 | Yang ............................ 123/295 |

(Continued)

FOREIGN PATENT DOCUMENTS

| JP | 2000-110670 A | 4/2000 |
| JP | 2000-257467 A | 9/2000 |

(Continued)

OTHER PUBLICATIONS

Corresponding International Search Report with English Translation dated Jun. 1, 2010 (five (5) pages).

(Continued)

Primary Examiner — Stephen K Cronin
Assistant Examiner — Arnold Castro
(74) Attorney, Agent, or Firm — Crowell & Moring LLP

(57) ABSTRACT

An object is to provide a control device and control method for a compressed self-ignition type internal combustion engine, which can reduce torque variation due to misfire when the air-fuel ratio varies during compressed self-ignition type combustion, and thereby effectively use the potential for reducing fuel consumption. As the combustion mode, a spark-ignition type combustion mode by use of an ignition plug and a compressed self-ignition type combustion mode which utilizes a pressure increase in a combustion chamber in association with upward movement of piston are selectively set depending on an operational state of the engine, and when the air-fuel ratio in the compressed self-ignition type combustion mode is rich, a regional upper limit of the compressed self-ignition type combustion region is changed toward the lower engine torque side, and when the air-fuel ratio is lean, the regional upper limit is changed toward the higher engine torque side.

7 Claims, 15 Drawing Sheets

U.S. PATENT DOCUMENTS

| | | | | |
|---|---|---|---|---|
| 6,725,825 B1* | 4/2004 | Kurtz et al. | | 123/295 |
| 6,957,640 B1* | 10/2005 | Liu et al. | | 123/305 |
| 7,021,276 B2* | 4/2006 | Liu et al. | | 123/299 |
| 7,121,255 B2* | 10/2006 | Liu et al. | | 123/305 |
| 7,240,659 B2* | 7/2007 | Yang | | 123/295 |
| 7,255,095 B1* | 8/2007 | Brevick et al. | | 123/568.11 |
| 7,461,628 B2* | 12/2008 | Blumberg et al. | | 123/304 |
| 7,469,672 B2* | 12/2008 | Andri | | 123/198 F |
| 7,574,983 B2* | 8/2009 | Kuo | | 123/25 C |
| 7,765,994 B2* | 8/2010 | Winstead | | 123/568.13 |
| 7,957,887 B2* | 6/2011 | Kumano et al. | | 701/103 |
| 7,992,538 B2* | 8/2011 | Yamashita et al. | | 123/299 |
| 8,050,846 B2* | 11/2011 | Kakuya et al. | | 701/103 |
| 2004/0084010 A1* | 5/2004 | Kurtz et al. | | 123/295 |
| 2005/0224045 A1* | 10/2005 | Kuzuyama | | 123/305 |
| 2005/0235952 A1* | 10/2005 | Kuzuyama et al. | | 123/305 |
| 2007/0215095 A1* | 9/2007 | Kakuya et al. | | 123/295 |
| 2007/0215120 A1* | 9/2007 | Koopmans et al. | | 123/491 |
| 2007/0289572 A1* | 12/2007 | Petridis et al. | | 123/305 |
| 2008/0127933 A1* | 6/2008 | Blumberg et al. | | 123/304 |
| 2008/0281497 A1* | 11/2008 | Kumano et al. | | 701/102 |
| 2009/0048761 A1* | 2/2009 | Kang et al. | | 701/103 |
| 2009/0048765 A1* | 2/2009 | Kang et al. | | 701/108 |
| 2009/0205612 A1* | 8/2009 | Wermuth et al. | | 123/406.19 |
| 2009/0259387 A1* | 10/2009 | Kakuya et al. | | 701/103 |
| 2010/0312455 A1* | 12/2010 | Yamashita et al. | | 701/103 |
| 2012/0055445 A1* | 3/2012 | Kakuya et al. | | 123/305 |

FOREIGN PATENT DOCUMENTS

| | | |
|---|---|---|
| JP | 2002-188445 A | 7/2002 |
| JP | 2007-9925 A | 1/2007 |
| JP | 2007-107486 A | 4/2007 |
| JP | 2008-75566 A | 4/2008 |
| JP | 2008-88813 A | 4/2008 |

OTHER PUBLICATIONS

Form PCT/ISA/237 (three (3) pages).

* cited by examiner

CONTROL DEVICE FOR COMPRESSED SELF-IGNITION TYPE INTERNAL COMBUSTION ENGINE

TECHNICAL FIELD

The present invention relates to a control device for a compressed self-ignition type internal combustion engine, and particularly to a control device for a compressed self-ignition type internal combustion engine that is suitable for switching a combustion mode between spark-ignition type combustion and compressed self-ignition type combustion.

BACKGROUND ART

In an internal combustion engine (engine) used for automobiles and the like, a compressed self-ignition type gasoline engine (hereinafter, a compressed self-ignition engine), which compresses an air-fuel mixture to cause self-ignition combustion (compressed self-ignition type combustion), has gained attention as a means of concurrently achieving improvements in fuel economy and in emission performance. Compared with spark-ignition type combustion in which the air-fuel mixture is caused to ignite and burn with a spark of an ignition plug, a compressed self-ignition engine can concurrently achieve fuel economy and emission performance, since it reduces fuel consumption through an increased efficiency by high compression ratio, a reduction of pumping loss, and a reduction of cooling loss through fast combustion, etc. and also reduces NOx concentration in the exhaust gas through low temperature combustion of the air-fuel mixture.

Among the means of realizing compressed self-ignition type combustion is the introduction of EGR. While the spark-ignition type combustion is performable in a region where the air-fuel ratio is relatively rich and the EGR rate is relatively low, the compressed self-ignition type combustion when the above described means is adopted is performable in a region where the air-fuel ratio is relatively lean and the internal EGR rate is relatively high. Moreover, an unstable combustion region in which both types of combustion become unstable exists between the respective regions. It is noted that as the method for introducing EGR, a method of causing exhaust gas to remain in the cylinder by providing a negative valve overlap period which is the period in which both the intake valve and the exhaust valve are closed in an exhaust stroke (internal EGR), a method of admitting exhaust gas with fresh air by providing a bypass from the exhaust pipe in the upstream of the intake valve (external EGR), or a method of readmitting exhaust gas by opening the exhaust valve in an intake stroke (exhaust gas readmission) is used.

When the method of compressed self-ignition type combustion as described above is applied, since a large amount of exhaust gas is introduced into the cylinder, and thereby the fresh air quantity is limited, the engine torque that can be produced will be limited to lower loading if supercharging is not performed. Further, it is known that in each stroke of intake, compression, expansion, and exhaust, since it is necessary to ensure a finite time for the fuel to undergo chemical reaction, the engine rotational speed is also limited to a lower rotational speed.

Because of that, it is proposed that when a compressive self-ignition engine is applied to an automobile, both of spark-ignition type combustion and compressed self-ignition type combustion are performed so that those combustion types are switched to realize an engine torque that the driver demands.

In the compressed self-ignition type combustion, combustion is possible in an atmosphere in which the air-fuel ratio, which is the mass ratio between the air quantity and fuel quantity in the cylinder, is leaner (less fuel quantity) compared with the case of spark-ignition type combustion. Therefore, aiming at the reduction of fuel consumption and discharge quantity of NOx, the air-fuel ratio is set to be lean in the compressed self-ignition type combustion. This is realized by making the throttle opening full open to take in a large amount of air into the cylinder. But, since the fresh air quantity is limited in a naturally aspirated engine as described above, the air-fuel ratio in a compressed self-ignition type combustion region changes to the rich side (more fuel) as the engine torque increases. Particularly, when the air-fuel ratio becomes excessively rich, the progress of the oxidation reaction of fuel becomes difficult due to a decline of the concentration of oxygen and the temperature of the air-fuel mixture in the cylinder, and there may be case where the combustion stability declines eventually leading to misfire. From what is described above, it is often the case that the air-fuel ratio of the higher load side in the compressed self-ignition type combustion region is set at a near stoichiometric value.

While, in the compressed self-ignition type combustion, the throttle is fully opened to introduce a large amount of air into the cylinder to make the air-fuel ratio lean as described above, the air quantity that can be introduced varies depending on various conditions. Examples of such condition include surrounding environments such as the atmospheric pressure and air temperature, operating states such as manufacturing variation and deterioration of the intake and exhaust valves which perform gas exchange of the cylinder, and operating states of the injector which injects fuel.

If the air-fuel ratio becomes richer due to the change of the various conditions when trying to produce a higher engine torque by compressed self-ignition type combustion, the air-fuel ratio will become excessively richer than an initially planned air-fuel ratio and, as a result of that, the continuation of the compressed self-ignition type combustion becomes impossible, thus leading to a misfire. Moreover, if the air-fuel ratio becomes leaner, since the combustion can be performed at an air-fuel ratio which is leaner than initially planned, the compressed self-ignition type combustion region can be expanded toward the higher engine torque side, enabling further reduction of fuel consumption. However, if the compressed self-ignition type combustion region in the initial setting is maintained, its potential for reducing fuel consumption cannot be effectively utilized.

Thus, there is a problem in that to ensure the operability and reduce the fuel consumption with satisfaction in an engine that switches two combustion modes like a compressive self-ignition engine, the compressed self-ignition type combustion region must be changed according to the air-fuel ratio during compressed self-ignition type combustion.

As a method for solving this problem, a technology to change the combustion region based on the air-fuel ratio is known (for example, Patent Literature 1). Patent Literature 1 relates to the technology for switching between combustion in the combustion region which is performed at a relatively low engine torque, and combustion in the second combustion region which is performed at a relatively high engine torque in a diesel engine. To be specific, the engine torque upper limit in the combustion region is changed toward the higher engine torque side when the air-fuel ratio is rich, based on the air-fuel ratio during the operation in the combustion region. Moreover, when the air-fuel ratio is lean, the engine torque upper limit in the combustion region is changed toward the lower engine torque side.

CITATION LIST

Patent Literature

Patent Literature 1: JP Patent Publication (Kokai) No. 2000-110670

SUMMARY OF INVENTION

Technical Problem

Although the technology disclosed by Patent Literature 1 described above is effective for a diesel engine, when it is applied to a compressive self-ignition engine, it is not possible to satisfy both the requirements of the operability and the reduction of fuel consumption. To be specific, when the air-fuel ratio during compressed self-ignition type combustion is richer than its initial setting, the upper limit of the compressed self-ignition type combustion region is changed toward the higher engine torque side. At this time, a problem exists in that even though the fresh air quantity is lower than in the initial state as a result of the air-fuel ratio being rich, the fuel quantity will be increased as the engine torque is increased, and the newly set air-fuel ratio in the vicinity of the compressed self-ignition type combustion region becomes excessively rich, thus leading to a misfire. Moreover, a problem exists in that if the upper limit of the compressed self-ignition type combustion region is changed toward the lower engine torque side when the air-fuel ratio during compressed self-ignition type combustion is leaner than the initial setting, the performance of compressed self-ignition type combustion will be limited despite the fact that the air-fuel ratio at the upper limit is lean, thus disabling the effective use of the potential for reducing fuel consumption.

In view of the above described problems, it is an object of the present invention to provide a control method capable of satisfying both the requirements of the operability and the fuel economy in a compressive self-ignition engine even when the air-fuel ratio is changed as a result of the changes in the surrounding environments of the engine and the operating states of on-board apparatuses.

Solution to Problem

In order to achieve the above described object, a control device for a compressed self-ignition type internal combustion engine is used for a compressed self-ignition type internal combustion engine having: an injector for directly injecting fuel into a combustion chamber; an ignition device for igniting the fuel injected into the combustion chamber; an intake valve provided in an intake side of a cylinder that makes up a part of the combustion chamber, and of which actuating timing is controllable; an exhaust valve provided in an exhaust side of the cylinder, and of which actuating timing is controllable, and a throttle capable of controlling an air quantity that flows into the combustion chamber, and the control device for a compressed self-ignition type internal combustion engine has a spark-ignition type combustion mode in which fuel sprayed from the injector is ignited by the ignition device to burn the fuel and actuate the internal combustion engine, and a compressed self-ignition type combustion mode, in which the fuel injected from the injector is caused to burn by a pressure rise in the cylinder in association with upward movement of a piston that makes up the combustion chamber to actuate the internal combustion engine, wherein when an air-fuel ratio which is a mass ratio between an air quantity and a fuel quantity introduced into the combustion chamber while the compressed self-ignition type combustion mode is performed is richer than a predetermined value, an upper limit of torque in the compressed self-ignition type combustion region which is determined by a torque and an engine rotational speed which are working states of the internal combustion engine, and in which the compressed self-ignition type combustion mode is stably performable is changed toward a direction in which the upper limit decreases.

Further, the control device is configured such that when the air-fuel ratio while the compressed self-ignition type combustion mode is performed is leaner than a predetermined value, the upper limit of torque of the compressed self-ignition type combustion region is changed toward a direction in which the upper limit increases.

As another embodiment, the control device for a compressed self-ignition type internal combustion engine relating to the present invention is configured such that when the air-fuel ratio is richer than the predetermined value while the compressed self-ignition type combustion mode is performed, and there is a demand for increasing torque to not lower than the upper limit of the compressed self-ignition type combustion region while the compressed self-ignition type combustion mode is performed, the torque is increased in the spark-ignition type combustion mode, after the torque is increased in the compressed self-ignition type combustion mode with a quantity of torque to be increased in the compressed self-ignition type combustion mode being decreased to be less than a quantity of torque to be increased when the air-fuel ratio is the predetermined value with reference to torque before there is the demand for increasing the torque.

Moreover, the control device is configured such that when the air-fuel ratio is leaner than a predetermined value while the compressed self-ignition type combustion mode is performed, and there is a demand for increasing the torque to not lower than the upper limit of the compressed self-ignition type combustion region while the compressed self-ignition type combustion mode is performed, the torque is increased in the spark-ignition type combustion mode, after the torque is increased in the compressed self-ignition type combustion mode with a quantity of torque to be increased in the compressed self-ignition type combustion mode being increased to be more than a quantity of torque to be increased when the air-fuel ratio is a predetermined value with reference to the torque before there is the demand for increasing the torque.

As a further embodiment, the control device for a compressed self-ignition type internal combustion engine relating to the present invention is configured such that when the air-fuel ratio while the compressed self-ignition type combustion mode is performed is richer than a predetermined value, and there is a demand for increasing the torque to be not less than an upper limit of the compressed self-ignition type combustion region while the compressed self-ignition type combustion mode is performed, the torque is increased in the spark-ignition type combustion mode, after the torque is increased in the compressed self-ignition type combustion mode with a period during which the torque is increased in the compressed self ignition type combustion mode being reduced with reference to a period during which the compressed self-ignition type combustion mode is continued before there is the demand for increasing the torque.

Further, the control device is configured such that when the air-fuel ratio while the compressed self-ignition type combustion mode is performed is leaner than a predetermined value, and there is a demand for increasing the torque to be not lower than the upper limit of the compressed self-ignition type combustion region, the torque is increased in the spark-ignition type combustion mode, after the torque is increased in the compressed self-ignition type combustion mode with a period during which the torque is increased in the compressed self-ignition type combustion mode being extended with reference to a period during which the compressed self-ignition type combustion mode is continued before there is a demand for increasing the torque.

Further, the control device for a compressed self-ignition type internal combustion engine relating to the present invention is configured such that, the air-fuel ratio to be used to change the upper limit of the compressed self-ignition type combustion region is determined based on an output signal of a sensor provided in the downstream of the exhaust valve and for detecting air-fuel ratio.

As another embodiment, the air-fuel ratio is determined based on an output signal of any one of sensors provided in the internal combustion engine, including: a sensor for measuring the flow rate of air passing through an intake pipe; a sensor for measuring the pressure in an intake pipe; a sensor for measuring temperature of air quantity flowing into the combustion chamber; a sensor for measuring an atmospheric pressure; a sensor for measuring engine temperature of the internal combustion engine; a sensor for measuring a flow rate of the fuel passing through the injector; and a sensor for measuring the pressure to be applied to the fuel to inject the fuel from the injector.

ADVANTAGEOUS EFFECTS OF INVENTION

According to the present invention, it becomes possible to suppress misfire and ensure operability, and further to make effective use of the potential of compressed self-ignition type combustion for reducing fuel consumption, even when the air fuel ratio in the compressed self-ignition type combustion changes as a result of the occurrence of the change in the surrounding environment and in the operating state of the apparatus mounted on the engine.

DESCRIPTION OF EMBODIMENTS

Hereinafter, using FIGS. 1 to 15, the configuration and operation of the control device for a compressed self-ignition type internal combustion engine according to embodiments of the present invention will be described.

First, using FIG. 1, the configuration of an engine system in which the control device for a compressed self-ignition type internal combustion engine according to the present embodiment is applied to a gasoline engine for automobile will be described.

Figure 1:
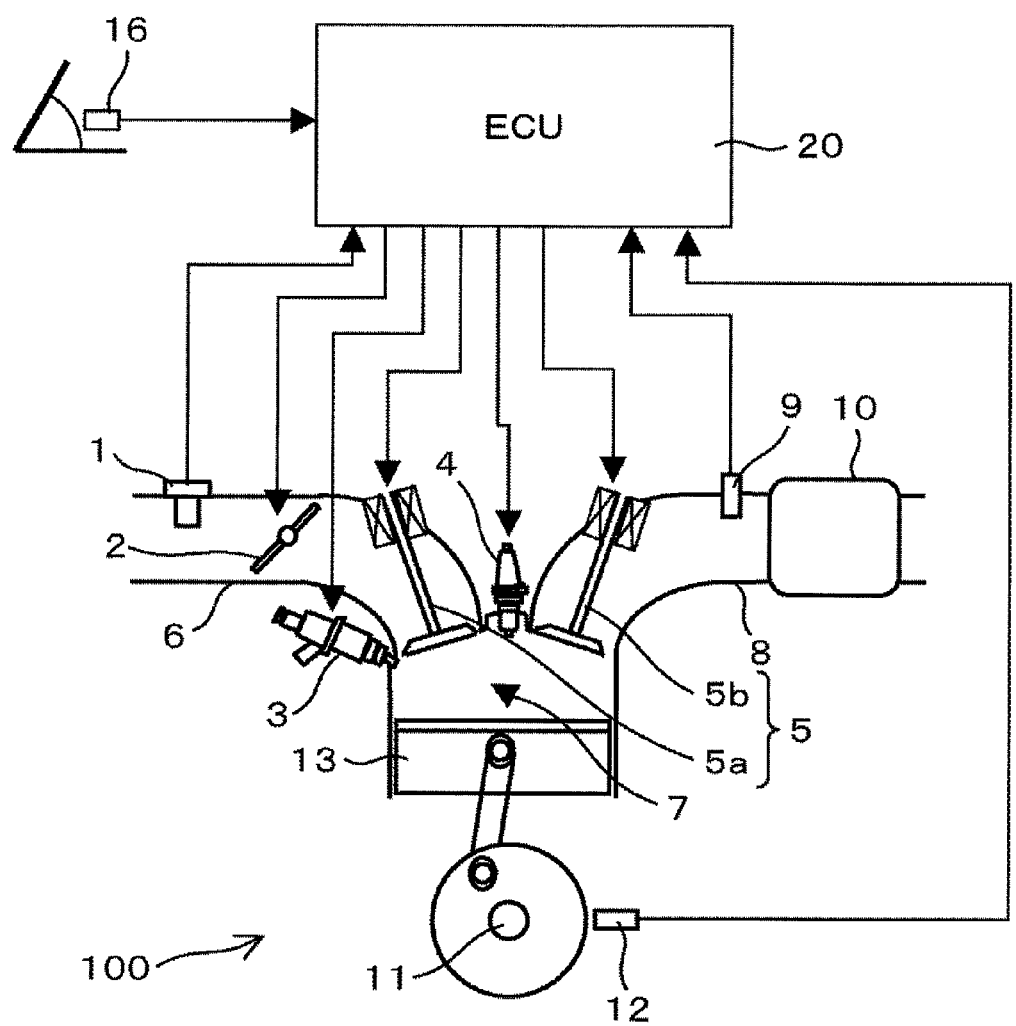
FIG. 1 is a system configuration diagram to show the configuration of an engine system in which the control device for a compressed self-ignition type internal combustion engine according to an embodiment of the present invention is applied to a gasoline engine for automobile.

FIG. 1 is a system configuration diagram to show the configuration of an engine system in which the control device for a compressed self-ignition type internal combustion engine according to an embodiment of the present invention is applied to a gasoline engine for automobile.

An engine 100 is a gasoline engine for automobile that performs spark-ignition type combustion and compressed self-ignition type combustion. An airflow sensor 1 for measuring an intake air quantity and an electronic control throttle 2 for adjusting the flow rate of intake air are provided at respective appropriate locations of an intake pipe 6. Moreover, the engine 100 is provided with an injector 3 for injecting fuel into a combustion chamber surrounded by a cylinder 7 and a piston 14, and an ignition plug (ignition device) 4 for igniting the fuel injected into the combustion chamber by supplying ignition energy, at respective appropriate locations of the cylinder 7.

Moreover, a variable valve 5 made up of an intake valve 5a for adjusting the intake gas that flows into the cylinder, and an exhaust valve 5b for adjusting the exhaust gas that is discharged from the cylinder are provided at respective appropriate locations of the cylinder 7.

Further, the engine 100 is provided with a three-way catalyst 10 for cleaning the exhaust gas, and an air-fuel ratio sensor 9, which is a form of an air-fuel ratio detector, for detecting the air-fuel ratio of exhaust gas in the upstream side of the three-way catalyst 10, at appropriate locations of an exhaust pipe 8. Moreover, a crank angle sensor 12 for calculating a rotational angle is provided in a crankshaft 11. Further, an accelerator opening sensor 16 for detecting an accelerator opening is provided.

The signals obtained from the airflow sensor 1, the air-fuel ratio sensor 9, and the crank angle sensor 12 are sent to an engine control unit (a control device: ECU) 20. Moreover, the signal obtained from the accelerator opening sensor 16 is sent to the ECU 20. It is noted that the accelerator opening sensor 16 detects a depression quantity of the accelerator pedal, that is, an accelerator opening. The ECU 20 calculates a required torque based on the output signal of the accelerator opening sensor 16. That is, the accelerator opening sensor 16 is used as a required-torque detection sensor for detecting a required torque for the engine. Moreover, the ECU 20 calculates the rotational speed of engine based on the output signal of the crank angle sensor 12. The ECU 20 optimally calculates major working quantities of the engine including an air flow rate, a fuel injection quantity, and an ignition timing based on the operational states of the engine obtained from the outputs of the above described various sensors.

The fuel injection quantity calculated at the ECU 20 is converted into a valve-opening pulse signal, and sent to the injector 3. Moreover, an ignition plug driving signal is sent to the ignition plug 4 such that ignition is performed at an ignition timing calculated at the ECU 20. Moreover, the throttle opening calculated at the ECU 20 is sent to the electronic control throttle 2 as a throttle driving signal. Furthermore, the working quantity of the variable valve calculated at the ECU 20 is sent to the variable valve 5 made up of the intake valve 5a and the exhaust valve 5b, as a variable valve driving signal.

Next, using FIG. 2, the configuration of the control device for a compressed self-ignition type internal combustion engine according to the present embodiment will be described.

Figure 2:
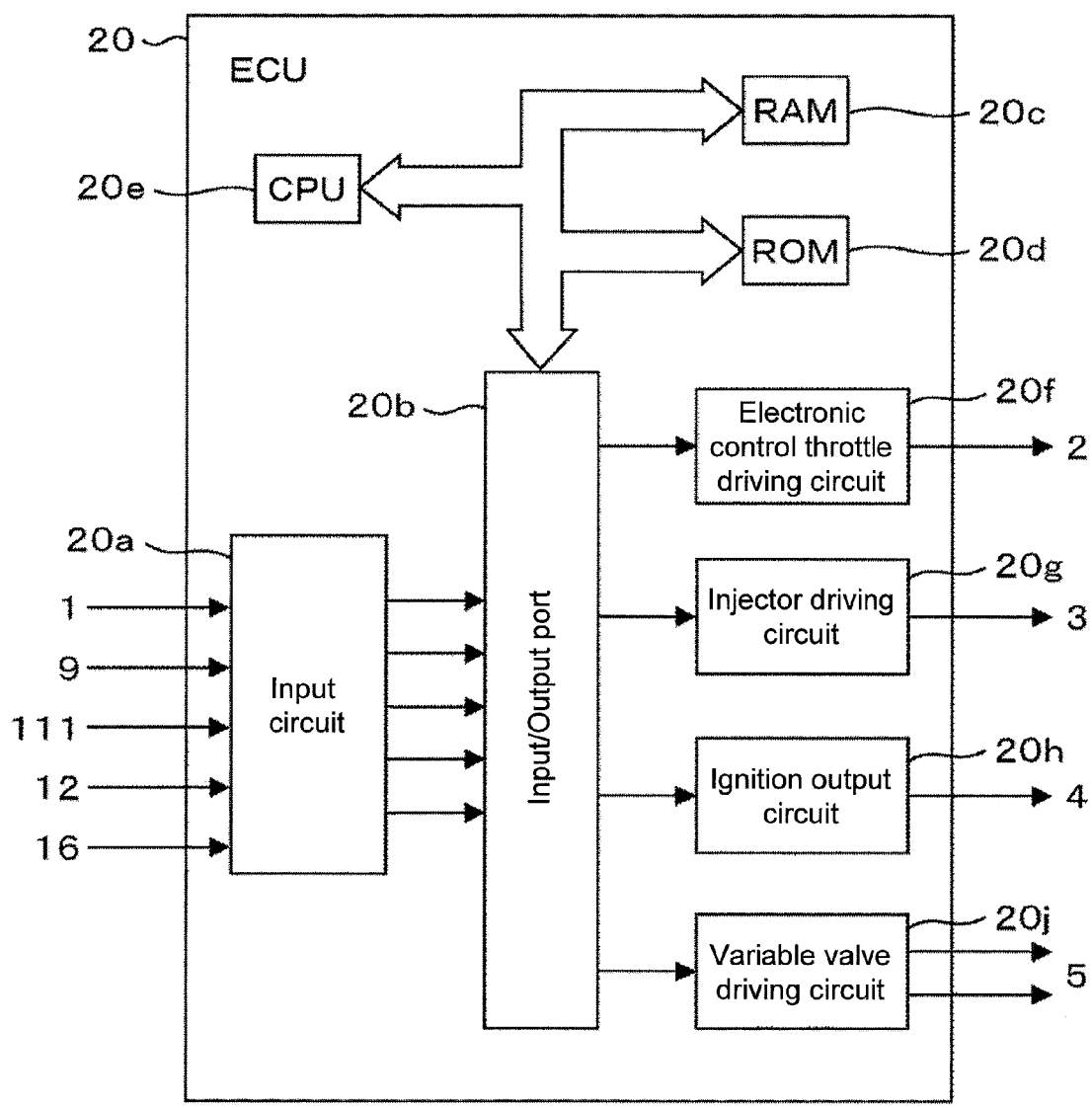
FIG. 2 is a system block diagram to show the configuration of the control device for a compressed self-ignition type internal combustion engine according to an embodiment of the present invention.

FIG. 2 is a system block diagram to show the configuration of the control device for a compressed self-ignition type internal combustion engine according to an embodiment of the present invention.

Output signals of the airflow sensor 1, the air-fuel ratio sensor 9, an exhaust temperature sensor 111, and the crank angle sensor 12 are inputted to an input circuit 20a of the ECU 20. However, the input signals are not limited to these, and the above described signals are inputted as well. Thus inputted input signal of each sensor is sent to an input port in an input/output port 20b. Values sent to the input/output port 20b are stored in a RAM 20c and subjected to calculation processing at a CPU 20e. A control program that describes the contents of calculation processing is written into a ROM 20d in advance.

After being stored in the RAM 20c, the values representing the working quantity of each actuator, which are calculated according to the control program, are sent to an output port in the input/output port 20b, and are sent to each actuator via each driving circuit. In the case of the present embodiment, the driving circuit includes an electronic throttle driving circuit 20f, an injector driving circuit 20g, an ignition output circuit 20h, and a variable valve driving circuit 20j. Each circuit respectively controls the electronic control throttle 2, the injector 3, the ignition plug 4, and the variable valve 5 to perform combustion control to be described below. In the present embodiment, although the present invention is a device in which the above described driving circuits are provided in the ECU 20, such configuration is not limiting, and any of the above described driving circuits may be provided in the ECU 20.

Next, using FIG. 3, the configuration of combustion mode switching of the control device for a compressed self-ignition type internal combustion engine according to the present embodiment will be described.

Figure 3:
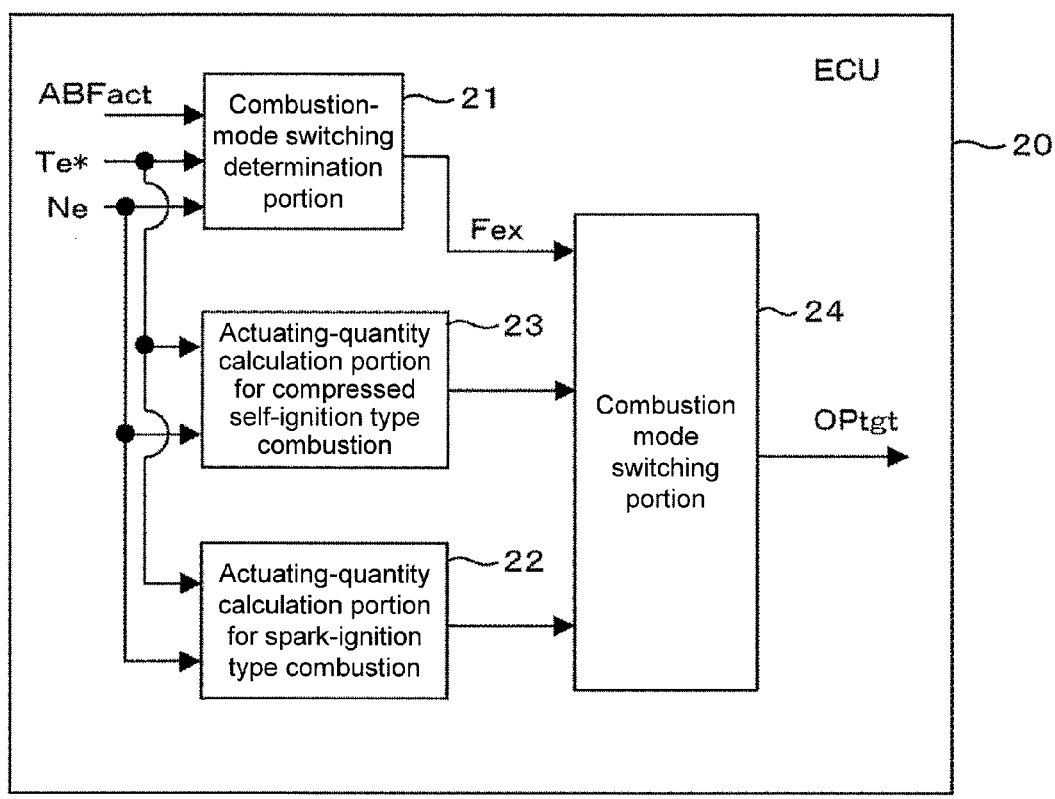
FIG. 3 is a control block diagram to show the configuration of combustion mode switching of the control device for a compressed self-ignition type internal combustion engine according to an embodiment of the present invention.

FIG. 3 is a control block diagram to show the configuration of combustion mode switching of the control device for a compressed self-ignition type internal combustion engine according to an embodiment of the present invention.

The ECU 20 performs the switching control of combustion mode for suppressing the deterioration of operation performance when performing the switching of combustion modes between spark-ignition type combustion and compressed self-ignition type combustion. Hereinafter, a combustion-mode switching control between spark-ignition type combustion and compressed self-ignition type combustion in the switching control of combustion mode will be described.

The ECU 20 includes a combustion-mode switching determination portion 21, an actuating-quantity calculation portion 22 for spark-ignition type combustion, an actuating-quantity calculation portion 23 for compressed self-ignition type combustion, and a combustion mode switching portion 24. It is noted that each portion illustrated is to be used for the switching control of combustion mode, and other configurations are omitted from illustration.

The combustion-mode switching determination portion 21 determines if the combustion mode can be switched, by using the map of FIGS. 5 and 6 to be described below based on a required engine torque Te* required for the engine 100, an engine rotational speed Ne, and ABFtgt which is an output signal from the air-fuel ratio sensor 9, and sets up a combustion mode switching flag Fex. The required engine torque Te* is calculated separately within the ECU 20 based on an accelerator opening detected by the accelerator opening sensor 16 as described above. The engine rotational speed Ne is separately calculated within the ECU 20 based on the detection signal of the crank angle sensor 12.

Figure 4:
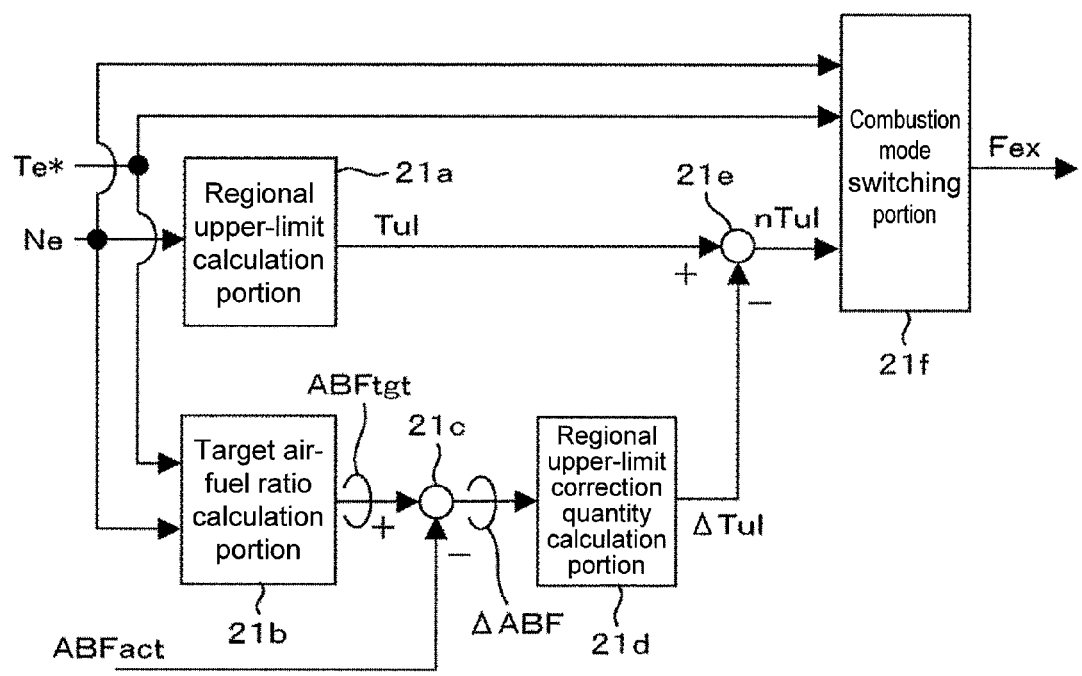
FIG. 4 is a control block diagram to show the configuration of combustion-mode switching determination of the control device for a compressed self-ignition type internal combustion engine according to an embodiment of the present invention.

Now, using FIG. 4, the combustion-mode switching determination portion 21 will be described. FIG. 4 is a control block diagram to show the configuration of the combustion-mode switching determination portion 21 of FIG. 3. The combustion-mode switching determination portion 21 includes a regional upper-limit calculation portion 21a, a target air-fuel ratio calculation portion 21b, a subtraction portion 21c, a regional upper-limit correction quantity calculation portion 21d, a subtraction portion 21e, and a combustion mode switching portion 21f.

Figure 5:
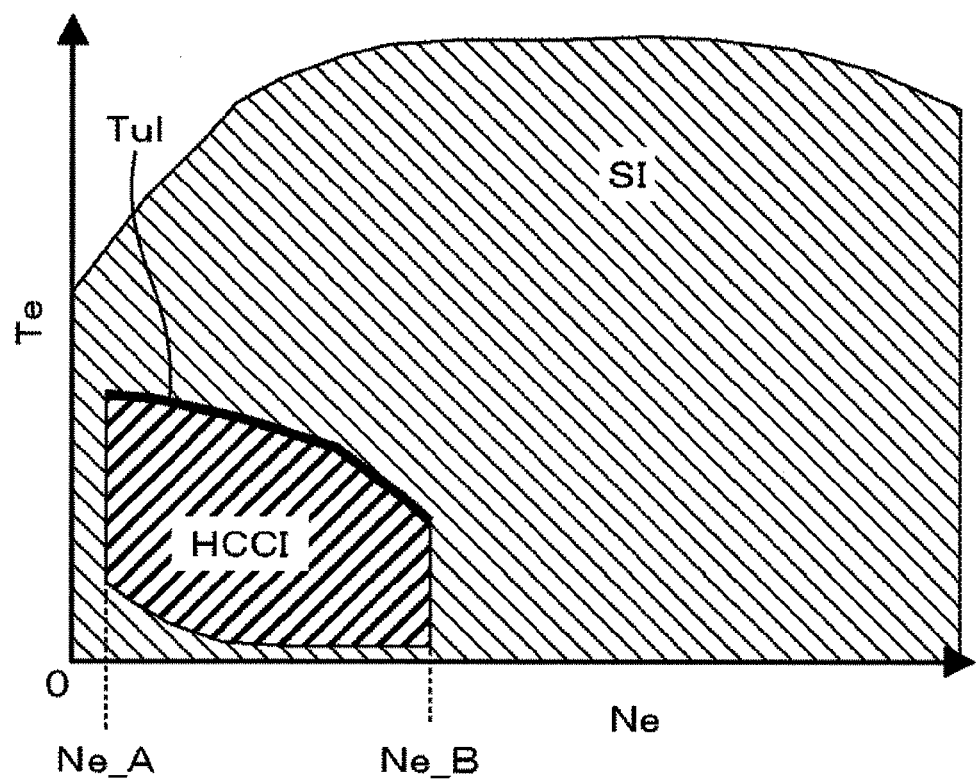
FIG. 5 is an explanatory diagram to show the combustion regions of a spark-ignition type combustion mode and a compressed self-ignition type combustion mode, and an upper limit in an engine torque direction of the compressed self-ignition type combustion region.

The regional upper-limit calculation portion 21a calculates an upper limit Tul of engine torque Te to which compressed self-ignition type combustion mode is performable, based on a map, for example, shown in FIG. 5.

Now, using FIG. 5, combustion regions of a spark-ignition type combustion mode and a compressed self-ignition type combustion mode will be described. FIG. 5 is an explanatory diagram of the combustion regions of the spark-ignition type combustion mode and the compressed self-ignition type combustion mode, and an upper limit of a target engine torque Te* to which the compressed self-ignition type combustion mode can be performed. In FIG. 5, the abscissa shows the engine rotational speed Ne and the ordinate shows the engine torque Te.

The spark-ignition (SI) type combustion mode is a combustion mode in which fuel sprayed from the injector 3 is ignited and burnt by an ignition plug (an ignition device) 4 to actuate the engine (internal combustion engine), and can be implemented in a wide range from a lower rotational speed to a higher rotational speed of the engine rotational speed Ne, and from a lower torque to a higher torque of the engine torque Te.

On one hand, the compressed self-ignition type combustion mode (also referred to as HCCI: Homogenous Charge Compression Ignition) is a combustion mode in which the fuel injected from the injector 3 is caused to burn by a pressure increase in the cylinder in association with a rise of the piston 14 that constitutes a combustion chamber thereby actuating the internal combustion engine (engine), and the method for implementing this mode includes those by intake heating, high-pressure compression, or internal EGR introduction, etc. Among those, considering the cost and operation in the spark-ignition type combustion mode, the internal EGR introduction through the manipulation of valve timing is a method with high feasibility. During the compressed self-ignition type combustion by the internal EGR introduction, it is necessary to increase the internal EGR quantity in the combustion chamber compared with during the spark-ignition type combustion mode. Since, because of this, the fresh air quantity that flows into the cylinder is limited, and the chemical reaction from the formation of a mixture to combustion requires a finite time, the compressed self-ignition type combustion mode HCCI is realizable in a naturally aspirated engine in a working state of lower load and lower rotational speed as shown in FIG. 5.

Moreover, in FIG. 5, an upper limit Tul of the engine torque Te in a region where the compressed self-ignition type combustion mode is performable is shown. As described above, since the fresh air quantity is limited in the internal EGR introduction, the upper limit Tul is determined depending on the engine rotational speed Ne. The region where the compressed self-ignition type combustion mode is performable, and the upper limit of engine torque may be determined by a test or simulation in advance, or may be based on a mathematical model that describes the compressed self-ignition type combustion.

Figure 6:
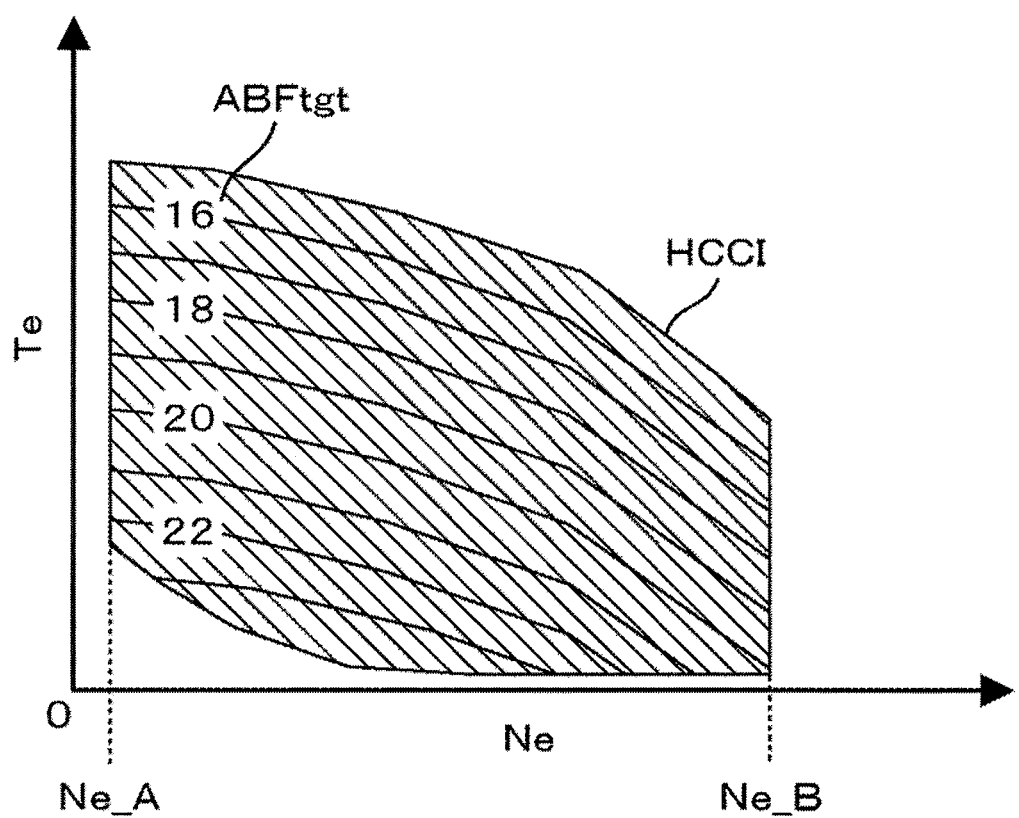
FIG. 6 is an explanatory diagram to show the air-fuel ratio during the compressed self-ignition type combustion mode at a predetermined condition in the compressed self-ignition type combustion region.

The target air-fuel ratio calculation portion 21b calculates a target air-fuel ratio ABFtgt during the compressed self-ignition type combustion mode according to the target engine torque Te* and the engine rotational speed Ne based on, for example, the map shown in FIG. 6.

Now, using FIG. 6, the target air-fuel ratio during the compressed self-ignition type combustion mode will be described. FIG. 6 is an explanatory diagram to show a target air-fuel ratio ABFtgt in a predetermined state at an operational condition which is determined by the target engine torque Te* and the engine rotational speed Ne during the compressed self-ignition type combustion mode. In FIG. 6, the abscissa shows the engine rotational speed Ne and the ordinate shows the engine torque Te.

As shown in FIG. 5, the compressed self-ignition type combustion mode is limited to operational conditions of a lower engine torque and a lower rotational speed. Since lean combustion is performed during the compressed self-ignition type combustion mode, the opening of the electronic control throttle 2 is increased as much as possible to introduce a large amount of air into the cylinder. At this time, the fuel quantity required in the compressed self-ignition type combustion region increases as the engine torque Te increases, and therefore the engine rotational speed increases. Therefore, the air-fuel ratio becomes lean at a lower engine torque and a lower engine rotational speed, and the air-fuel ratio becomes richer as the fuel quantity increases in association with an increase of engine torque and an increase of engine rotational speed. The air-fuel ratio listed in FIG. 6 is an example at a predetermined condition and not limiting. Moreover, the target air-fuel ratio ABFtgt shown in FIG. 6 may be determined by an experiment or simulation in advance, or may be calculated based on a mathematical model that describes the air-fuel ratio during compressed self-ignition combustion. The air-fuel ratio shown in FIG. 6 is an example of a predetermined condition, and this is not limiting.

Moreover, the subtraction portion 21c subtracts ABFact which is the output signal of the air-fuel ratio sensor 9 from the target ABFtgt to calculate $\Delta$ABF which is a difference of air-fuel ratio.

The regional upper-limit correction quantity calculation portion 21d calculates $\Delta$Tul for correcting the upper limit Tul of the engine torque in the compressed self-ignition type combustion mode based on $\Delta$ABF which is a difference of air-fuel ratio. For example, the regional upper-limit correction quantity calculation portion 21d may calculate a fuel injection quantity for realizing the operational condition when $\Delta$ABF which is a difference of air-fuel ratio is calculated, and after calculating the air quantity in association with $\Delta$ABF based on $\Delta$ABF and the fuel injection quantity, may calculate the regional upper-limit correction quantity $\Delta$Tul based on the air quantity. Moreover, based on the map to show the target air-fuel ratio ABFtgt during the compressed self-ignition type combustion mode shown in FIG. 6, the regional upper-limit correction quantity calculation portion 21d may subtract $\Delta$ABFtgt from the target fuel-air ratio ABFtgt, search for an air-fuel ratio which is the subtraction of $\Delta$ABF from ABFtgt at a current engine rotational speed Ne on the target air-fuel ratio map of FIG. 6, and calculate engine torque 1 which offers the matched target air-fuel ratio ABFtgt, to let the quantity which is the subtraction of the engine torque from the regional upper limit Tul be $\Delta$Tul. Moreover, the regional upper-limit correction quantity calculation portion 21d is not limited to what is described above, and may be based on a mathematical model that describes the compressed self-ignition type combustion.

Further, the subtraction portion 21e subtracts the regional upper-limit correction quantity ΔTul which is the output of the regional upper-limit correction quantity calculation portion 21d from the regional upper-limit calculation portion Tul which is the output of the regional upper-limit calculation portion 21a, and outputs it as a new regional upper limit nTul of the engine torque Te of the compressed self-ignition type combustion mode in the current operational state The combustion mode switching portion 21f changes a combustion mode switching flag Fex from OFF(=0) to ON (=1) to perform the combustion switching from the spark-ignition type combustion mode to the compressed self-ignition type combustion mode based on the target engine torque Te*, the engine rotational speed Ne, and the new regional upper limit nTul if the operational region is where the compressed self-ignition type combustion mode is performable when the spark-ignition type combustion mode is being performed, based on, for example, the combustion region shown in FIG. 5. Moreover, when the compressed self-ignition type combustion mode is being performed, the combustion mode switching portion 21f changes the combustion mode switching flag Fex from ON(=1) to OFF(=0) to change the combustion mode from the compressed self-ignition type combustion mode to the spark-ignition type combustion mode when the operational condition determined by the target engine torque Te* and the engine rotational speed is changed to the outside of the compressed self-ignition type combustion region, based on the target engine torque Te*, the engine rotational speed Ne and the new regional upper limit nTul.

Figure 7:
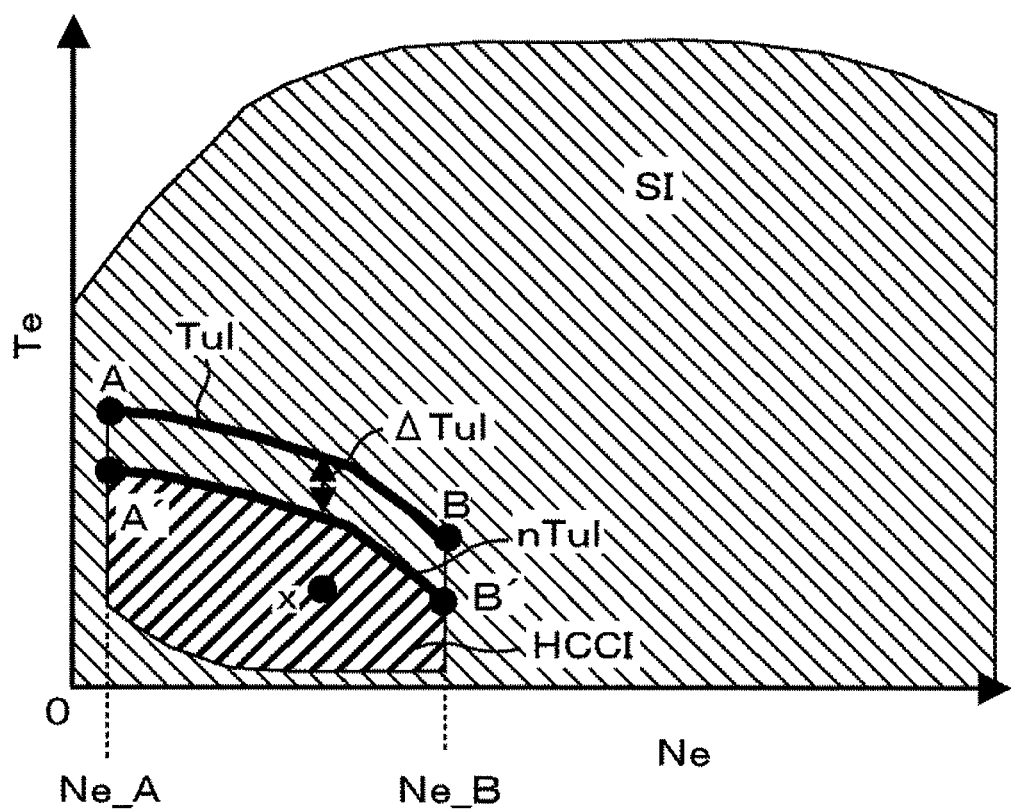
FIG. 7 is an explanatory diagram to show the operation to change a regional upper limit of the compressive self-ignition region toward the lower engine torque side when a measured air-fuel ratio during the compressed self-ignition type combustion mode is richer than a target air-fuel ratio of initial setting, in an embodiment of the present invention.

Moreover, using FIGS. 7 and 8, concrete calculation of the combustion-mode switching determination portion 21 will be described. In FIG. 7, when the air-fuel ratio, which is the ratio between the air quantity and fuel quantity which are introduced into the combustion chamber where the compressed self-ignition type combustion mode is being performed, is richer than a predetermined value, the upper limit of the torque of the compressed self-ignition type combustion region is changed toward the direction where the upper limit decreases (the upper limit in the torque direction of the compressed self-ignition type combustion region is changed toward the direction where the torque decreases). To be specific, FIG. 7 is an explanatory diagram to show the operation of the combustion-mode switching determination portion 21 when a measured air-fuel ratio ABFact, which is the output signal of the air-fuel ratio sensor 9 at an operational condition x is richer than the target air-fuel ratio ABFtgt. In FIG. 7, a line segment Tul shown by a point A and a point B shows the engine torque upper limit of the compressed self-ignition type combustion mode region in the initial setting. Further, a line segment nTul shown by a point N and a point B' shows a new regional upper limit determined based on the regional upper-limit correction quantity ΔTul and the regional upper limit Tul. If the difference ΔABF is positive (the measured air-fuel ratio ABFact is richer than the target air-fuel ratio ABFtgt), the combustion-mode switching determination portion 21 subtracts the regional upper-limit correction quantity ΔTul from the regional upper limit Tul, and changes the compressed self-ignition type combustion region to a region narrower than the initial setting (a region where the engine torque is lower) surrounded by the new regional upper limit nTul.

Figure 8:
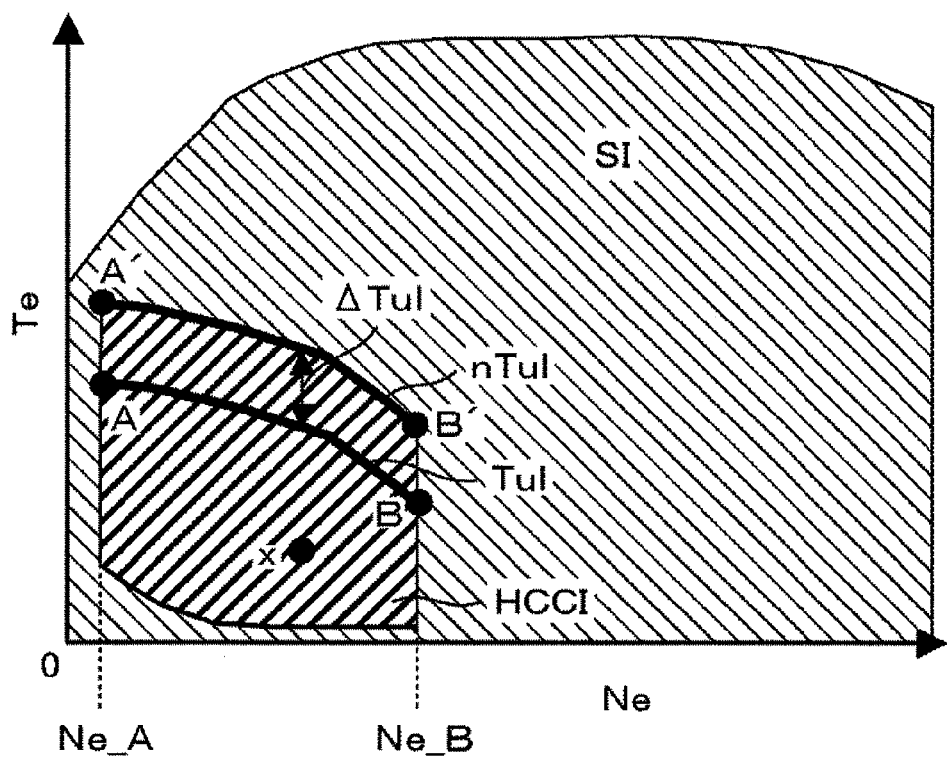
FIG. 8 is an explanatory diagram to show the operation to change a regional upper limit of the compressive self-ignition region toward the higher engine torque side when a measured air-fuel ratio during the compressed self-ignition type combustion mode is leaner than a target air-fuel ratio of initial setting, in an embodiment of the present invention.

Further, in FIG. 8, when the air-fuel ratio while the compressed self-ignition type combustion mode is performed is leaner than a predetermined value, the upper limit of torque of compressed self-ignition type combustion region is changed toward the direction where the upper limit increases (the upper limit in the torque direction of the compressed self-ignition type combustion region is changed toward the direction where the torque increases). To be specific, FIG. 8 is an explanatory diagram to show the operation of the combustion-mode switching determination portion 21 when the measured air-fuel ratio ABFact at the operational condition x is leaner than the target air-fuel ratio (when the difference ΔABF of the air-fuel ratio becomes negative). In FIG. 8, a line segment Tul shown by a point A and a point B shows the engine torque upper limit of the compressed self-ignition type combustion mode region in the initial setting. Moreover, a line segment nTul shown by a point A' and a point B' shows a new regional upper limit determined based on the regional upper-limit correction quantity ΔTul and the regional upper limit Tul. Since the difference of air-fuel ratio ΔABF is negative, the combustion-mode switching determination portion 21 adds the regional upper-limit correction quantity ΔTul to the regional upper limit Tul, and changes the compressed self-ignition type combustion region to a region broader than the initial setting (a region where the engine torque is higher) surrounded by the new regional upper limit nTul.

In FIG. 3, an actuating-quantity calculation portion 22 for spark-ignition type combustion calculates a target set value for a device (such as an electronic control throttle 2, an injector 3, an ignition plug 4, a variable valve 5, etc.) provided in the engine for performing spark-ignition type combustion, based on the target engine torque Te* and the engine rotational speed Ne. Further, the actuating-quantity calculation portion 23 for compressed self-ignition type combustion calculates a target set value of the above described device for performing compressed self-ignition type combustion, based on the target engine torque Te* and the engine rotational speed Ne. Further, the combustion mode switching portion 24 outputs the target set value of the above described device as OPtgt to each device to realize a combustion mode according to the combustion mode switching flag Fex, based on the combustion mode switching flag Fex, the calculation result from the actuating-quantity calculation portion 22 for spark-ignition type combustion and the calculation result from the actuating-quantity calculation portion 23 for compressed self-ignition type combustion.

As a result, the engine 100 of FIG. 1 is operated in either of the combustion modes of the compressed self-ignition type combustion mode and the spark-ignition type combustion mode such that the required engine torque Te* is outputted.

Here, the target actuating quantity OPtgt includes the opening of the electronic control throttle 2 (throttle opening), the fuel injection pulse width and fuel injection timing to the injector 3, the ignition timing to the ignition plug 4, the opening timing and actuation period of the intake valve 5a, and the opening and closing timing of the exhaust valve 5b, which are actuated when controlling the combustion of the engine 100. These target actuating quantities OPtgt are outputted to an electronic throttle driving circuit 20f, an injector driving circuit 20g, an ignition output circuit 20h, and a variable valve driving circuit 20j, shown in FIG. 2, respectively corresponding thereto, and the electronic control throttle 2, the injector 3, the ignition plug 4, and the variable valve 5 are controlled via the above described circuits according to the target actuating quantities OPtgt so that the combustion of the engine 100 is controlled.

Next, using FIGS. 9 to 15, the control content when the combustion mode is switched from the spark-ignition type combustion mode to the compressed self-ignition type mode by the control device of the compressed self-ignition type internal combustion engine in the present embodiment will be described.

Figure 9:
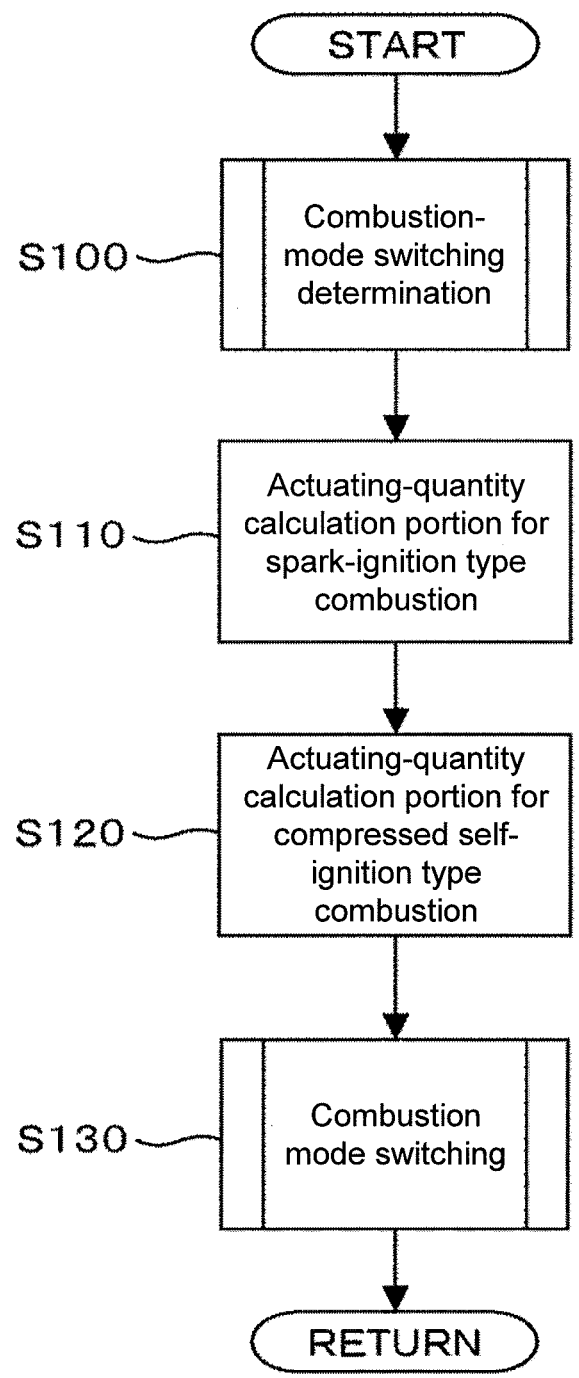
FIG. 9 is a flowchart to show the entirety of the control content by the control device for a compressed self-ignition type internal combustion engine according to an embodiment of the present invention.
Figure 10:
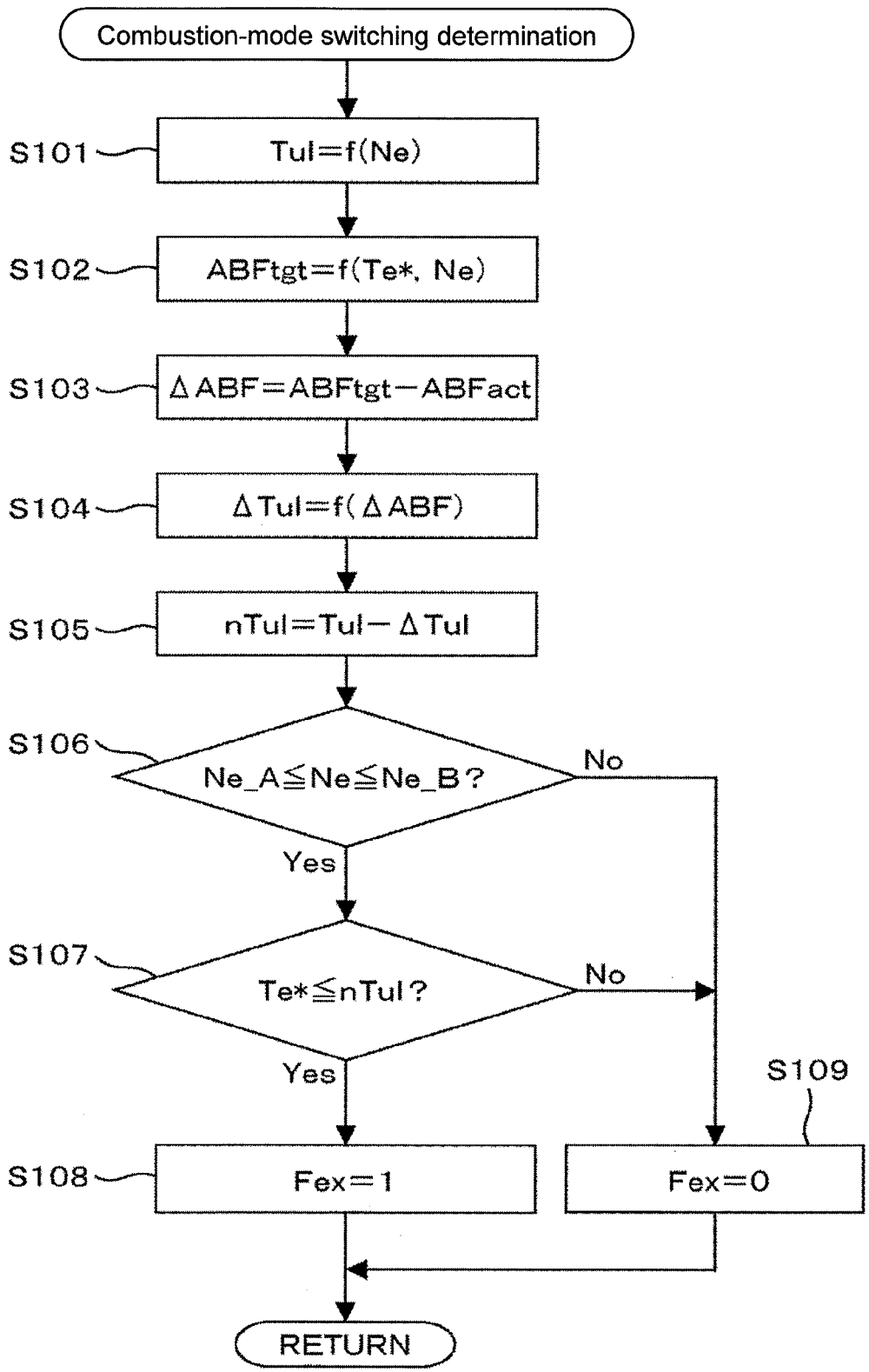
FIG. 10 is a flowchart to show the details of S100 (the combustion-mode switching determination processing) of FIG. 9.
Figure 11:
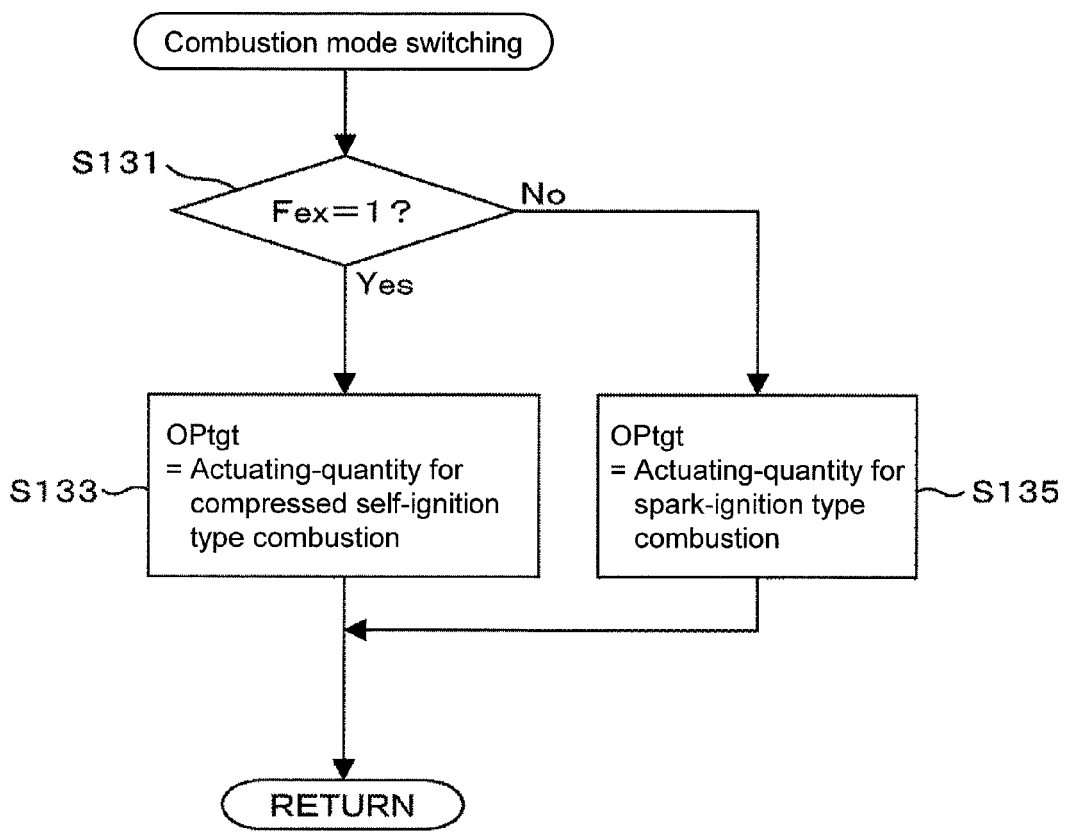
FIG. 11 is a flowchart to show the details of S130 (the combustion mode switching processing) of FIG. 9.
Figure 12:
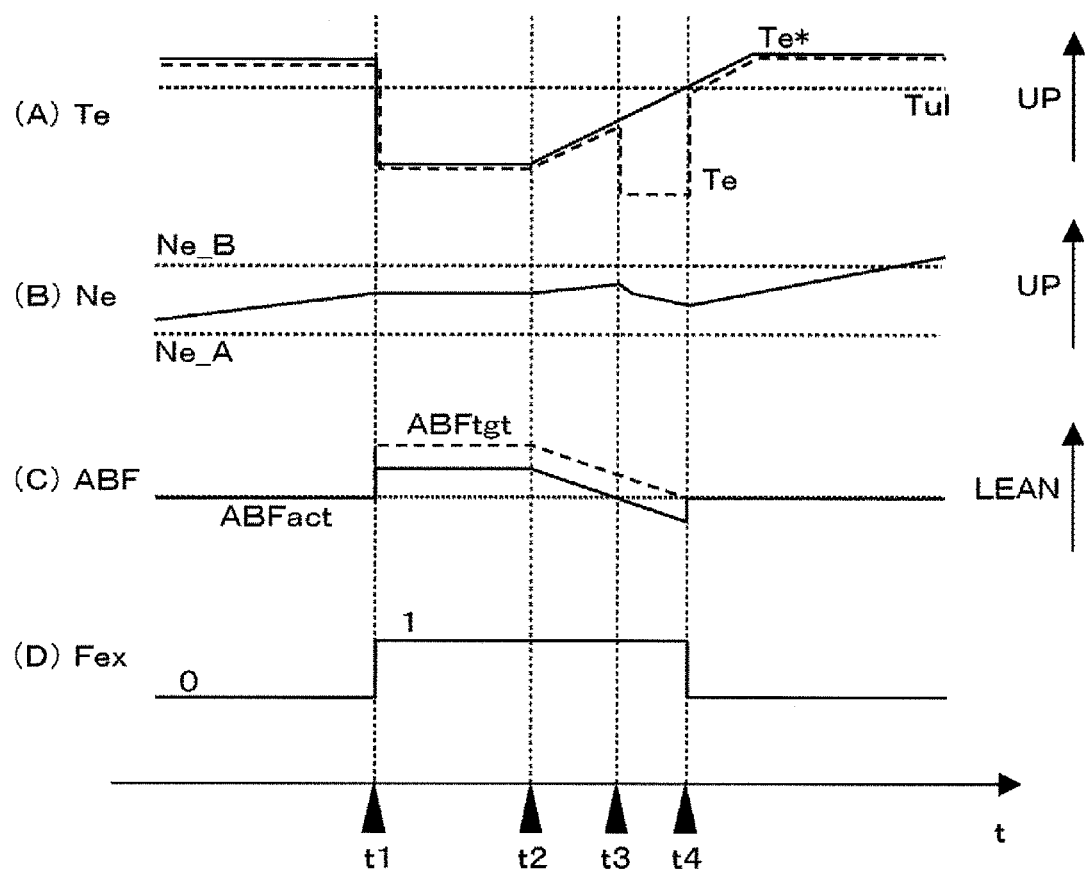
FIG. 12 is a timing chart to show the content of combustion-mode switching control between the spark-ignition type combustion mode and the compressed self-ignition type combustion mode, when a measured air-fuel ratio during the compressed self-ignition type combustion mode is richer than a target air-fuel ratio of initial setting when the control device for a compressed self-ignition type internal combustion engine according to an embodiment of the present invention is not applied.
Figure 13:
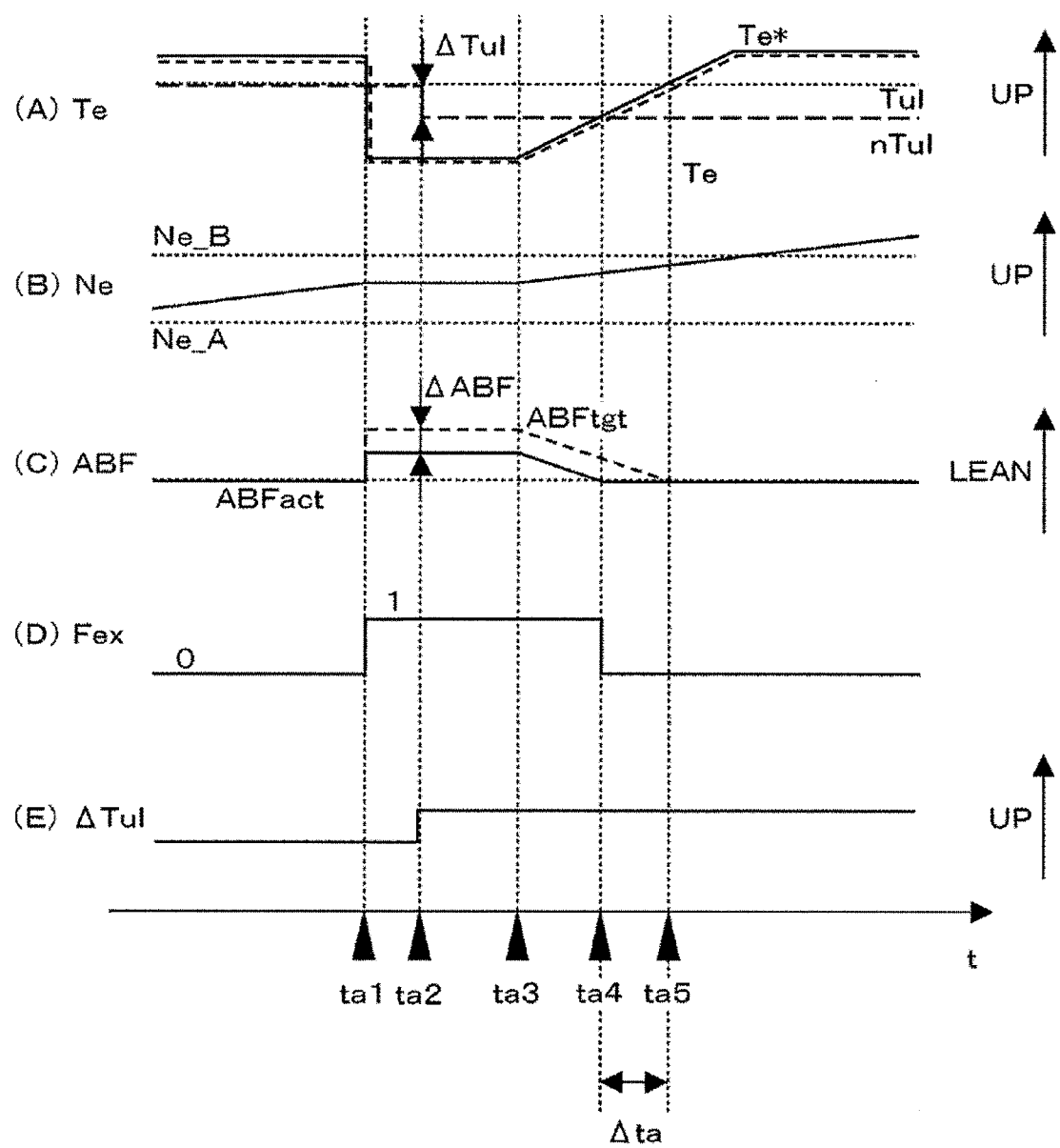
FIG. 13 is a timing chart to show the operating content when a measured air-fuel ratio during the compressed self-ignition type combustion mode is richer than a target air-fuel ratio of initial setting, among the cases where the combustion-mode switching control between the spark-ignition type combustion mode and the compressed self-ignition type combustion mode is performed by the control device of a compressed self-ignition type internal combustion engine according to an embodiment of the present invention.

FIG. 9 is a flowchart to show the entirety of the control content by the control device of the compressed self-ignition type internal combustion engine in an embodiment of the present invention. FIG. 10 is a flowchart to show the details of S100 (the combustion-mode switching determination processing) of FIG. 9. FIG. 11 is a flowchart to show the details of S130 (the combustion mode switching processing) of FIG. 9. FIG. 12 is a timing chart to show the switching control from the compressed self-ignition type combustion mode to the spark-ignition type combustion mode among the control contents by the control device for a compressed self-ignition type internal combustion engine according to an embodiment of the present invention. FIG. 13 is a timing chart to show the operational state of the engine when the switching control from the compressed self-ignition type combustion mode to the spark-ignition type combustion mode is performed by the control device for a compressed self-ignition type internal combustion engine according an embodiment of the present invention.

First, using FIG. 9, the entirety of the control content by the control device of the compressed self-ignition type internal combustion engine will be described.

In step S100 of FIG. 9, the combustion-mode switching determination portion 21 of FIG. 3 determines which of the spark-ignition type combustion and the compressed self-ignition type combustion is suitable for the current operational state, and sets the combustion mode switching flag Fex to be OFF(=0) if the result is the spark-ignition type combustion mode, and to be ON(=1) if the result is the compressed self-ignition type combustion mode. It is noted that details of step S100 will be described below by using FIG. 10.

Next, in step S110, the actuating-quantity calculation portion 22 for spark-ignition type combustion calculates a target actuating quantity of each device for producing a target engine torque in spark-ignition type combustion, based on the target engine torque Te* and the engine rotational speed Ne which are current operational states, and the process moves to step S120.

In step S120, the actuating-quantity calculation portion 23 for compressed self-ignition type combustion of FIG. 3 calculates a target actuating quantity for each device for producing a target engine torque in compressed self-ignition type combustion, based on the target engine torque Te* and the engine rotational speed Ne which are current operational states, and the process moves to step S130.

In step S130, the combustion mode switching portion 24 of FIG. 3 sets an actuating quantity suitable for the selected combustion mode to perform the combustion mode according to the combustion mode switching flag Fex which is the result of step S100. As a result of this, the engine 100 can perform the combustion control according to the current operational state. It is noted that details of step S130 will be described below by using FIG. 11.

Next, using FIG. 10, the detailed control content of S100 (the combustion-mode switching determination processing) of FIG. 9 will be described.

In step S101, the combustion-mode switching determination portion 21 of FIG. 3 calculates an engine torque upper limit Tul of the compressed self-ignition type combustion region in the initial setting based on the map shown in FIG. 5 according to the operational state determined by the required engine torque Te* and the engine rotational speed Ne, and the process moves to step S102.

In step S102, the combustion-mode switching determination portion 21 calculates the target air-fuel ratio ABFtgt during the compressed self-ignition type combustion in the initial setting, based on the map of FIG. 6 according to the operational state determined by the required engine torque Te* and the engine rotational speed Ne, and the process moves to step S103.

In step S103, the combustion-mode switching determination portion 21 calculates ΔABF which is the subtraction of a measured air-fuel ratio ABFact, which is the output signal of the air-fuel ratio sensor 9, from the target air-fuel ratio ABFtgt calculated in step S102, and the process moves to step S104.

In step S104, the combustion-mode switching determination portion 21 calculates the regional upper-limit correction quantity ΔTu1, which is the correction quantity of the engine torque upper limit of the compressed self-ignition type combustion region, based on the ΔABF calculated in step S103, and the process moves to step S105.

In step S105, the combustion-mode switching determination portion 21 performs the subtraction of the regional upper-limit correction quantity ΔTu1 calculated in step S104 from the regional upper limit Tul calculated in step S101 to calculate a new regional upper limit nTul at the current operational state, and the process moves to step S106.

In step S106, the combustion-mode switching determination portion 21 determines that the compressed self-ignition type combustion region is performable when the current engine rotational speed Ne is not less than Ne_A which is the lower limit of engine rotational speed of the compressed self-ignition type combustion region, and not more than Ne_B which is the upper limit of engine rotational speed of the compressed self-ignition type combustion region, based on the map for determining the compressed self-ignition type combustion region shown in FIG. 5. Moreover, when the current engine rotational speed Ne does not satisfy the condition of not less than Ne_A and not more than Ne_B, it is determined that the compressed self-ignition type combustion region is not performable, and the process moves to step S109 to perform the spark-ignition type combustion.

In step S107, when the target engine torque Te* is not more than the new regional upper limit nTul calculated in step S105, the combustion-mode switching determination portion 21 determines that compressed self-ignition type combustion is performable, and the process moves to step S108 to perform the compressed self-ignition type combustion. Moreover, when the target engine torque Te* is not less than the new regional upper limit nTul, it is determined that spark-ignition type combustion needs to be performed, and the process moves to step S109.

In step S108, the combustion-mode switching determination portion 21 determines that compressed self-ignition type combustion is performable, and sets the combustion mode switching flag Fex to be ON(=1), and a series of processing ends.

Moreover, in step S109, the combustion-mode switching determination portion 21 determines that spark-ignition type combustion is performable and sets the combustion mode switching flag Fex to be OFF(=0), and a series of processing ends.

Next, using FIG. 11, the detailed control content of S130 (the combustion mode switching processing) of FIG. 9 will be described.

In step S131, the combustion mode switching portion 24 of FIG. 3 determines whether or not the combustion mode switching flag Fex set in step S100 is ON(=1). If the combustion mode switching flag Fex is ON(=1), the process moves to step S133 to perform compressed self-ignition type combustion. Moreover, if the combustion mode switching flag Fex is OFF(=0), the process moves to step S135 to perform spark-ignition type combustion.

In step S133, to perform compressed self-ignition type combustion, the combustion mode switching portion 24 sets the actuating quantity for compressed self-ignition type combustion, which is calculated in the actuating-quantity calculation portion 23 for compressed self-ignition type combustion of FIG. 3, to the target actuating quantity OPtgt and a series of operation ends.

In step S135, to perform spark-ignition type combustion, the combustion mode switching portion 24 sets the actuating quantity for spark-ignition type combustion, which is calculated in the actuating-quantity calculation portion 22 for spark-ignition type combustion of FIG. 3, to the target actuating quantity OPtgt and a series of operation ends.

Next, using FIGS. 12 to 15, specific contents of the switching control between the spark-ignition type combustion mode and the compressed self-ignition type combustion mode by the control device for a compressed self-ignition type internal combustion engine according to an embodiment of the present invention.

FIG. 12 is a timing chart in the case where the air-fuel ratio during the compressed self-ignition type combustion mode becomes richer than the initial set value, when the switching control between the spark-ignition type combustion mode and the compressed self-ignition type combustion mode by the control device for a compressed self-ignition type internal combustion engine according to an embodiment of the present invention is not applied.

In FIG. 12, the abscissa shows time. The ordinate of FIG. 12(A) shows engine torque Te. The engine torque increases toward the upside of the figure. The ordinate of FIG. 12(B) shows engine rotational speed Ne. The engine rotational speed increases toward the upside of the figure. FIG. 12(C) shows the air-fuel ratio. The air-fuel ratio becomes leaner toward the upside of the figure. FIG. 12(D) shows the combustion mode switching flag. Fex=0 means that the combustion mode is the spark-ignition type combustion mode, and Fex=1 means that the combustion mode is the compressed self-ignition type combustion mode.

In FIG. 12, the solid line in FIG. 12(A) shows a target engine torque Te*, the broken line shows an engine torque Te produced, and the dotted line shows Tul which is an initial set value of the regional upper limit of the compressed self-ignition type combustion region shown in FIG. 5. The dotted lines Ne_A and Ne_B in FIG. 12(B) show respectively a lower limit and an upper limit of engine rotational speed up to which compressed self-ignition type combustion is performable. The solid line of FIG. 12(C) shows a measured air-fuel ratio ABFact which is the output signal of the air-fuel ratio sensor 9, and the broken line shows an initial set value ABFtgt of the target air-fuel ratio in the compressed self-ignition type combustion mode as in the map of FIG. 6, and the dotted line shows an air-fuel ratio near the stoichiometric value which is set in the spark-ignition type combustion mode.

In the abscissa of FIG. 12, time t1 shows the time when the target engine torque Te* becomes not more than the regional upper limit Tul. In the abscissa of FIG. 12, time t2 shows the time when the target engine torque Te* starts increasing. In the abscissa of FIG. 12, time t3 shows the time when the measured air-fuel ratio ABFact has become richer than the near stoichiometric value. In the abscissa of FIG. 12, time t4 shows the time when the target engine torque Te* becomes not less than the regional upper limit Tul.

While the spark-ignition type combustion mode is performed, if the target engine torque Te* becomes not more than the regional upper limit Tul, and if the engine rotational speed is not less than Ne_A and not more than Ne_B, at time t1 the combustion mode switching flag Fex is changed from 0 to 1 to switch the combustion mode to the compressed self-ignition type combustion mode. Although the compressed self-ignition type combustion mode is executed at and after time t1, since the air-fuel ratio ABFact becomes richer than the target air-fuel ratio ABFtgt, if the target engine torque Te* continues to be increased at and after time t2, the air-fuel ratio AbFact becomes richer than the near stoichiometric value at time t3. When the control device of the present invention is not applied, since compressed self-ignition type combustion is continued, when the air-fuel ratio becomes richer than the near stoichiometric value in the compressed self-ignition type combustion mode, the combustion becomes unstable, as described above, thereby leading to a misfire, so that the engine torque Te decreases and the engine rotational speed Ne decreases at and after time t3 in spite of an increase of the target engine torque Te*. If the target engine torque Te* becomes not less than the regional upper limit Tul at time t4, since the compressed self-ignition type combustion mode is switched to the spark-ignition type combustion mode, it is possible to increase the engine torque Te at and after time t4, and the engine rotational speed Ne increases. As so far described, when the regional upper limit is not changed according to the enrichment of the air-fuel ratio during the compressed self-ignition type combustion mode, the variation of engine toque will take place, making it difficult to ensure operating performance.

FIG. 13 is a timing chart in the case where the air-fuel ratio during the compressed self-ignition type combustion mode becomes richer than the initial set value, when the switching control between the spark-ignition type combustion mode and the compressed self-ignition type combustion mode by the control device for a compressed self-ignition type internal combustion engine according to an embodiment of the present invention is applied.

In FIG. 13, the abscissa shows time. The ordinate of FIG. 13(A) shows engine torque Te. The engine torque increases toward the upside of the figure. The ordinate of FIG. 13(B) shows engine rotational speed Ne. The engine rotational speed increases toward the upside of the figure. FIG. 13(C) shows the air-fuel ratio. The air-fuel ratio becomes leaner toward the upside of the figure. FIG. 13(D) shows the combustion mode switching flag. Fex=0 means that the combustion mode is the spark-ignition type combustion mode, and Fex=1 means that the combustion mode is the compressed self-ignition type combustion mode. FIG. 13(E) shows a regional upper-limit correction quantity $\Delta Tu1$ which is the quantity to vary the regional upper limit Tul in the engine torque direction in the compressed self-ignition type combustion region according to the air-fuel ratio. The regional upper-limit correction quantity $\Delta Tu1$ increases toward the upside of the figure.

In FIG. 13, the solid line in FIG. 13(A) shows a target engine torque Te*, the broken line shows an engine torque Te produced, and the dotted line shows Tul which is an initial set value of the regional upper limit of the compressed self-ignition type combustion region shown in FIG. 5, and the thick line shows a new regional upper limit nTul which is the subtraction of the regional upper-limit correction quantity $\Delta Tu1$ from the regional upper limit Tul. The dotted lines Ne_A and Ne_B in FIG. 13(B) respectively show the lower limit and the upper limit of engine rotational speed up to which compressed self-ignition type combustion is performable. The solid line of FIG. 13(C) shows a measured air-fuel ratio ABFact which is the output signal of the air-fuel ratio sensor 9, the broken line shows an initial set value ABFtgt of the target air-fuel ratio in the compressed self-ignition type combustion mode as in the map of FIG. 6, and the dotted line shows an air-fuel ratio near the stoichiometric value which is set in the spark-ignition type combustion mode.

In the abscissa of FIG. 13, time ta1 shows the time when the target engine torque Te* becomes not more than the regional upper limit Tul. In the abscissa of FIG. 13, time ta2 shows the time when ΔABF which is a difference between the target air-fuel ratio ABFtgt which is calculated in FIG. 13(C) and a measured air-fuel ratio AFBact is calculated and, based on the ΔABF, the regional upper limit is changed from Tul to a new regional upper limit nTul. In the abscissa of FIG. 13, time ta3 is the time when the target engine torque Te* starts increasing. In the abscissa of FIG. 13, in FIG. 13(A), time ta4 shows the time when the target engine torque Te* becomes not less than the new regional upper limit nTul, and in FIG. 13(C), the time when the measured air-fuel ratio ABFact becomes the near stoichiometric value. In the abscissa of FIG. 13, time ta5 is the time when the target engine torque Te* becomes not less than the regional upper limit Tul.

When the target engine torque Te* becomes not more than the regional upper limit Tul and the engine rotational speed Ne is not less than Ne_A and not more than Ne_B at time ta1 while the spark-ignition type combustion mode is performed, the combustion mode switching flag Fex is changed from 0 to 1 to switch the combustion mode to the compressed self-ignition type combustion mode. Thereafter, at and after time ta1, the compressed self-ignition type combustion mode is performed. At this moment, since it is detected that the measured air-fuel ratio ABFact is richer than the target air-fuel ratio ABFtgt, the difference of air-fuel ratio ΔABF is calculated at time ta2, and after the regional upper-limit correction quantity ΔTul is calculated based on ΔABF, the regional upper limit is changed based on ΔTul from Tul to the new regional upper limit nTul (Tul<nTul). After the target engine torque Te* starts increasing at time ta3, the air-fuel ratio ABFact will become richer. At this moment, when the target engine torque Te* becomes not less than the new regional upper limit nTul at time ta4, the combustion mode switching flag Fex is changed from 1 to 0 to quickly switch the combustion mode from the compressed self-ignition type combustion mode to the spark-ignition type combustion mode. As a result of this, the air-fuel ratio ABFact is appropriately controlled, and the near stoichiometric value which is the air-fuel ratio of the spark-ignition type combustion mode is kept at and after time ta4. Since this makes it possible to prevent the air-fuel ratio during the compressed self-ignition type combustion mode from becoming richer than the near stoichiometric vale, it is possible to suppress the decline of engine torque (mis-firing) with respect to the target engine torque, and the falling of engine rotational speed.

As so far described, by applying the control device for a compressed self-ignition type internal combustion engine, which is an embodiment of the present invention, it becomes possible to prevent the occurrence of misfire and to ensure operability of the compressed self-ignition type internal combustion engine even when the air-fuel ratio during the compressed self-ignition type combustion mode has become richer than the target air-fuel ratio of initial setting, by appropriately changing the regional upper limit of the compressed self-ignition type combustion region thereby preventing the air-fuel ratio during compressed self-ignition type combustion mode from becoming richer than the near stoichiometric value.

The specific action when the air-fuel ratio during compressed self-ignition type combustion mode is richer than the target air-fuel ratio of the initial setting, by the control device for a compressed self-ignition type internal combustion engine which is an embodiment of the present invention is not limited to that described above, and may be arranged as follows. To be specific, in FIG. 13, instead of calculating the regional upper-limit correction quantity ΔTu1 from the difference of air-fuel ratio ΔABF calculated at time ta2, the combustion mode switching flag Fex may be switched from 1 to 0 at time ta4 by inferring that the target engine torque Te* will become not less than the regional upper limit Tul of initial setting at time ta5 from the increasing trend of the target engine torque Te* at time ta3 and judging that the combustion mode needs to be switched from the compressed self-ignition type combustion mode to the spark-ignition type combustion mode, at a time which is earlier than time ta5 by a time period Ata, based on ΔABF previously calculated.

Next, using FIGS. 14 and 15, the case where the air-fuel ratio during compressed self-ignition type combustion mode becomes leaner than a target air-fuel ratio of initial setting will be described.

Figure 14:
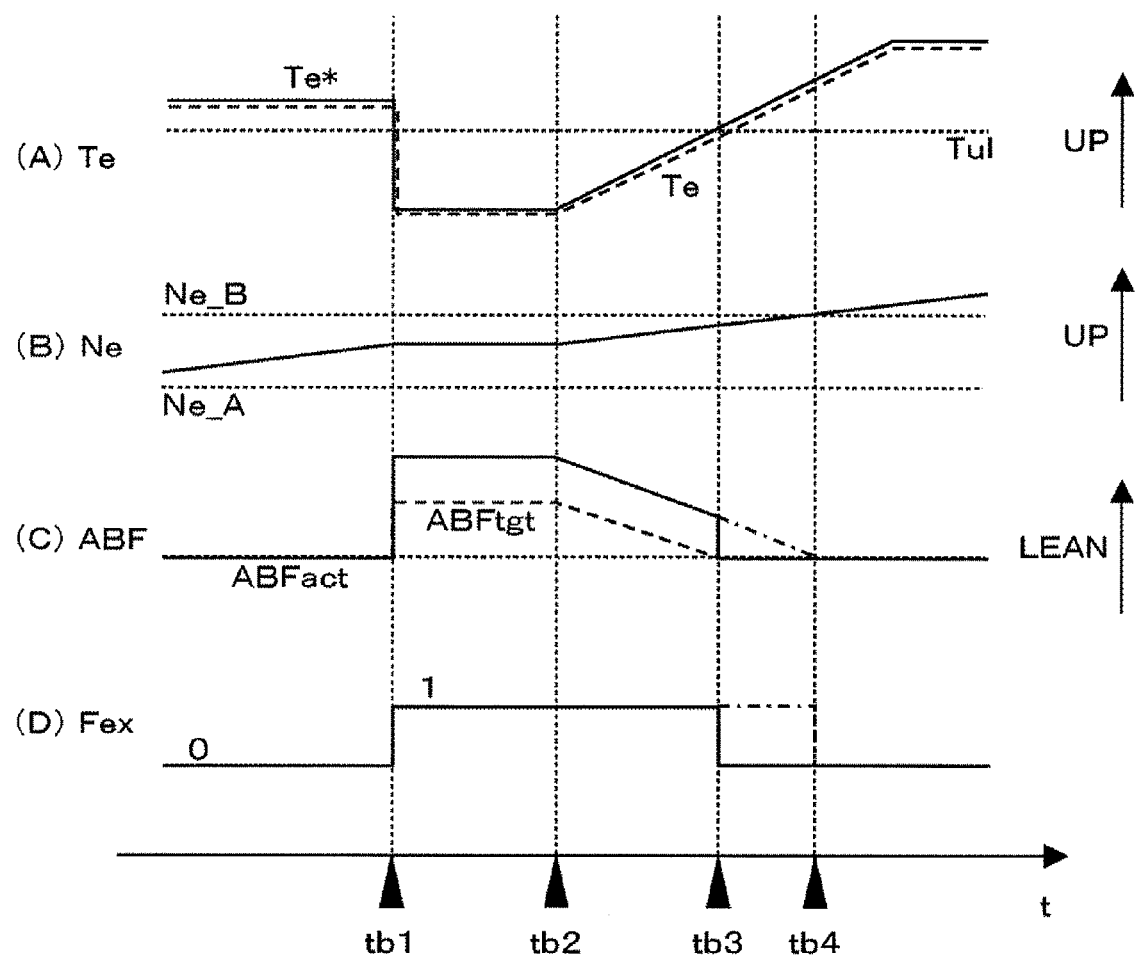
FIG. 14 is a timing chart to show the content of combustion-mode switching control between the spark-ignition type combustion mode and the compressed self-ignition type combustion mode, when a measured air-fuel ratio during the compressed self-ignition type combustion mode is leaner than a target air-fuel ratio of initial setting in the case where the control device for a compressed self-ignition type internal combustion engine according to an embodiment of the present invention is not applied.

FIG. 14 is a timing chart in the case where the air-fuel ratio during the compressed self-ignition type combustion mode becomes leaner than the initial set value, when the switching control between the spark-ignition type combustion mode and the compressed self-ignition type combustion mode by the control device for a compressed self-ignition type internal combustion engine according an embodiment of the present invention is not applied.

In FIG. 14, the abscissa shows time. The ordinate of FIG. 14(A) shows engine torque Te. The engine torque increases toward the upside of the figure. The ordinate of FIG. 14(B) shows engine rotational speed Ne. The engine rotational speed increases toward the upside of the figure. FIG. 14(C) shows air-fuel ratio. The air-fuel ratio becomes leaner toward the upside of the figure. FIG. 14(D) shows the combustion mode switching flag. Fex=0 means that the combustion mode is the spark-ignition type combustion mode, and Fex=1 means that the combustion mode is the compressed self-ignition type combustion mode.

In FIG. 14, the solid line in FIG. 14(A) shows a target engine torque Te*, the broken line shows an engine torque Te produced, and the dotted line shows Tul which is an initial set value of the regional upper limit of the compressed self-ignition type combustion region shown in FIG. 5. The dotted lines Ne_A and Ne_B of FIG. 14(B) respectively show a lower limit and an upper limit of engine rotational speed up to which the compressed self-ignition type combustion is performable. The solid line of FIG. 14(C) shows a measured air-fuel ratio ABFact which is the output signal of the air-fuel ratio sensor 9, the broken line shows an initial set value ABFtgt of the target air-fuel ratio in the compressed self-ignition type combustion mode as in the map of FIG. 6, and the dotted line shows an air-fuel ratio near the stoichiometric value which is set in the spark-ignition type combustion mode.

In the abscissa of FIG. 14, time tb1 shows the time when the target engine torque Te* becomes not more than the regional upper limit Tul. In the abscissa of FIG. 14, time tb2 shows the time when the target engine torque Te* starts increasing. In the abscissa of FIG. 14, time tb3 shows the time when the target engine torque Te* becomes not less than the regional upper limit Tul of initial setting, and the time when the combustion mode switching flag is changed from 1 to 0. In the abscissa of FIG. 14, time tb4 shows the time when the air-fuel ratio ABFact becomes the near stoichiometric value, and the time when the target engine torque Te* becomes not less than the regional upper limit Tul, when the target engine torque Te* is increased while the compressed self-ignition type combustion mode is continued without changing the combustion mode to the spark-ignition type combustion mode at time tb3.

When the target engine torque Te* becomes not more than the regional upper limit Tul, and the engine rotational speed is not less than Ne_A and not more than Ne_B at time tb1 while the spark-ignition type combustion mode is performed, the combustion mode switching flag Fex is changed from 0 to 1 to switch the combustion mode to the compressed self-ignition type combustion mode. While the compressed self-ignition type combustion mode is performed at and after time tb1, since the air-fuel ratio ABFact becomes leaner than the target air-fuel ratio ABFtgt, if the target engine torque Te* continues to be increased at and after tb2, the target engine torque Te* will become not less than the regional upper limit Tul in the initial setting at time tb3 when the air-fuel ratio ABFact becomes leaner than the near stoichiometric value so that even though the compressed self-ignition type combustion mode can be continued even if the target engine torque Te* increases thereafter, the combustion mode switching flag Fex is changed from 1 to 0 to switch the combustion mode to the spark-ignition type combustion mode. Therefore, it may not be possible to effectively utilize the potential for reducing fuel consumption by performing compressed self-ignition type combustion mode in a period from time tb3 to time tb4.

Figure 15:
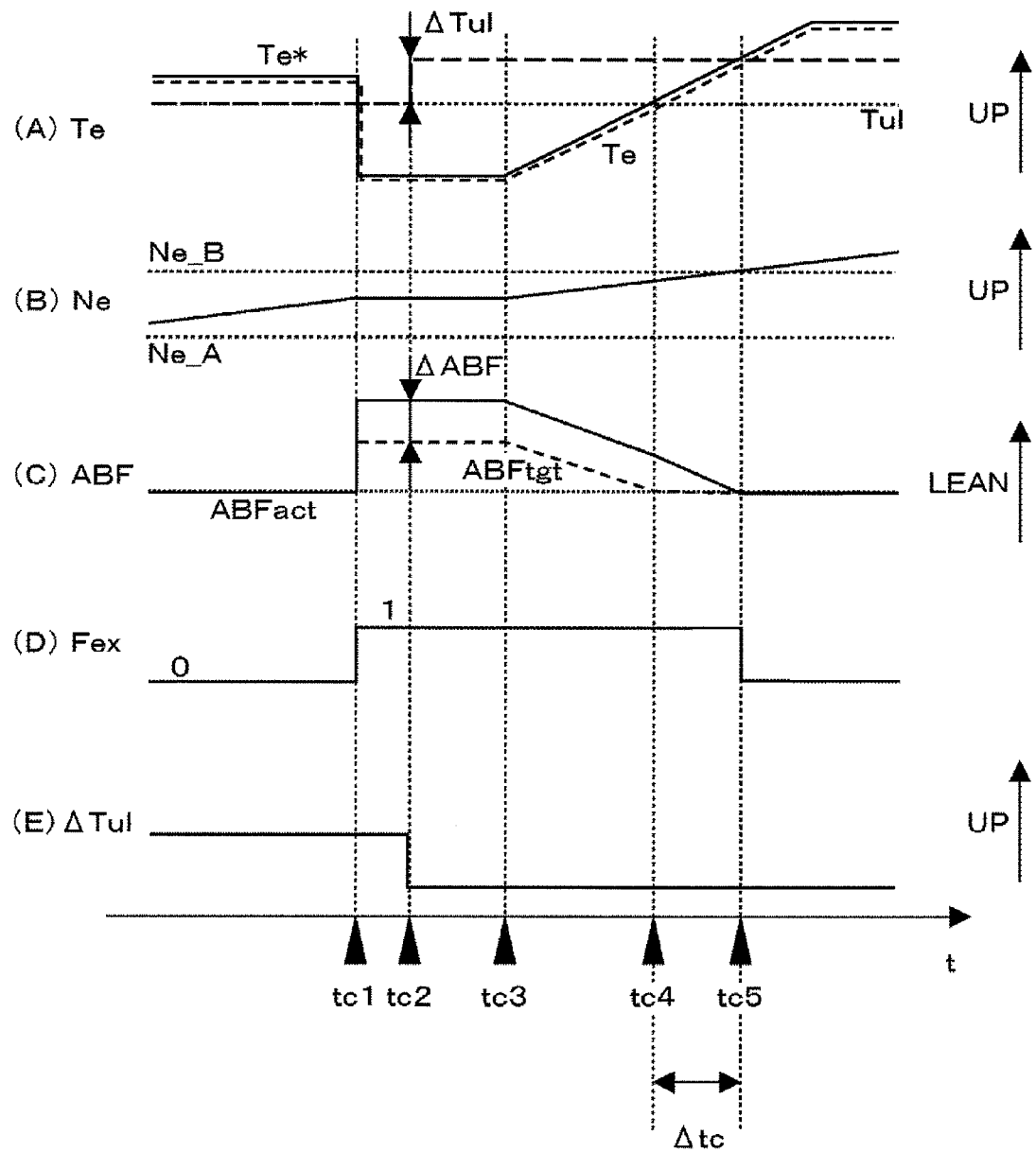
FIG. 15 is a timing chart to show the operating content when a measured air-fuel ratio during the compressed self-ignition type combustion mode is leaner than a target air-fuel ratio of initial setting, among the cases where combustion-mode switching control between the spark-ignition type combustion mode and the compressed self-ignition type combustion mode is performed by the control device for a compressed self-ignition type internal combustion engine according to an embodiment of the present invention.

FIG. 15 is a timing chart in the case where the air-fuel ratio during the compressed self-ignition type combustion mode becomes leaner than the initial set value, when the switching control between the spark-ignition type combustion mode and the compressed self-ignition type combustion mode by the control device for a compressed self-ignition type internal combustion engine according an embodiment of the present invention is applied.

In FIG. 15, the abscissa shows time. The ordinate of FIG. 15(A) shows engine torque Te. The engine torque increases toward the upside of the figure. The ordinate of FIG. 15(B) shows engine rotational speed Ne. The engine rotational speed increases toward the upside of the figure. FIG. 15(C) shows air-fuel ratio. The air-fuel ratio becomes leaner toward the upside of the figure. FIG. 15(D) shows the combustion mode switching flag. Fex=0 means that the combustion mode is the spark-ignition type combustion mode, and Fex=1 means that the combustion mode is the compressed self-ignition type combustion mode. FIG. 15(E) shows a regional upper-limit correction quantity ΔTu1 which is the quantity to vary the regional upper limit Tul in the engine torque direction in the compressed self-ignition type combustion region according to the air-fuel ratio. The regional upper-limit correction quantity ΔTu1 increases toward the upside of the figure.

In FIG. 15, the solid line in FIG. 15(A) shows a target engine torque Te*, the broken line shows an engine torque Te produced, and the dotted line shows Tul which is the initial set value of the regional upper limit of the compressed self-ignition type combustion region shown in FIG. 5, and the thick line shows a new regional upper limit nTul which is the subtraction of the regional upper-limit correction quantity ΔTu1 from the regional upper limit Tul. The dotted lines Ne_A and Ne_B in FIG. 15(B) respectively show a lower limit and an upper limit of engine rotational speed up to which compressed self-ignition type combustion is performable. The solid line of FIG. 15(C) shows a measured air-fuel ratio ABFact which is the output signal of the air-fuel ratio sensor 9, the broken line shows an initial set value ABFtgt of the target air-fuel ratio in the compressed self-ignition type combustion mode as in the map of FIG. 6, and the dotted line shows an air-fuel ratio near the stoichiometric value which is set in the spark-ignition type combustion mode.

In the abscissa of FIG. 15, time tc1 shows the time when the target engine torque Te* becomes not more than the regional upper limit Tul. In the abscissa of FIG. 15, time tc2 is the time when ΔABF which is a difference between the target air-fuel ratio ABFtgt which is calculated in FIG. 15(C) and the measured air-fuel ratio AFBact is calculated and, based on the ΔABF, the regional upper limit is changed from Tul to a new regional upper limit nTul. In the abscissa of FIG. 15, time tc3 is the time when the target engine torque Te* starts increasing. In the abscissa of FIG. 15, in FIG. 15(A), time tc4 shows the time when the target engine torque Te* becomes not less than the new regional upper limit Tul, and in FIG. 15(C), the time when the measured air-fuel ratio ABFact of initial setting becomes the near stoichiometric value. In the abscissa of FIG. 15, time ta5 is the time when the target engine torque Te* becomes not less than the new regional upper limit nTul and the time when the measured air-fuel ratio ABFact becomes the near stoichiometric value.

When the target engine torque Te* becomes not more than the regional upper limit Tul and the engine rotational speed Ne is not less than Ne_A and not more than Ne_B at time tc1 while the spark-ignition type combustion mode is performed, the combustion mode switching flag Fex is changed from 0 to 1 to switch the combustion mode to the compressed self-ignition type combustion mode. Thereafter, at and after time tc1, the compressed self-ignition type combustion mode is performed. At this moment, since it is detected that the measured air-fuel ratio ABFact is leaner than the target air-fuel ratio ABFtgt, the difference of air-fuel ratio ΔABF is calculated at time tc2, and after the regional upper-limit correction quantity ΔTu1 is calculated based on ΔABF, the regional upper limit is changed from Tul to the new regional upper limit nTul (Tul>nTul). After the target engine torque Te* starts increasing at time tc3, the air-fuel ratio ABFact will become leaner. In this case, although the target engine torque Te* becomes not less than the regional upper limit Tul of initial setting, since the air-fuel ratio is lean, it is judged that the compressed self-ignition type combustion mode can be continued and the compressed self-ignition type combustion mode is continued, so that the measured air-fuel ratio ABFact changes in the rich direction as the target engine torque Te* increases. When the target engine torque Te* becomes not less than the new regional upper limit nTul at time tc5, the measured air-fuel ratio ABFact becomes the near stoichiometric value and the combustion mode switching flag Fex is changed from 1 to 0 to switch the combustion mode from the compressed self-ignition type combustion mode to the spark-ignition type combustion mode.

As so far described, by applying the control device for a compressed self-ignition type internal combustion engine, which is an embodiment of the present invention, it becomes possible to effectively utilize the fuel economy potential of the compressed self-ignition type combustion mode and thereby realize further reduction of fuel consumption, even when the measured air-fuel ratio ABFact during the compressed self-ignition type combustion mode is leaner than the target air-fuel ratio ABFtgt of initial setting, by changing the regional upper limit of the compressed self-ignition type combustion mode to the increasing direction of the engine torque to continue the compressed self-ignition type combustion mode up to an engine torque at which it is performable even for an increase of the target engine torque.

The specific action by the control device for a compressed self-ignition type internal combustion engine which is an embodiment of the present invention, when the air-fuel ratio during compressed self-ignition type combustion mode is leaner than the target air-fuel ratio of initial setting, is not limited to that described above, and may be arranged as follows. To be specific, in FIG. 15, instead of calculating the regional upper-limit correction quantity ΔTul from the calculated difference ΔABF at time tc2, the combustion mode switching flag Fex may be switched from 1 to 0 at time tc5 by inferring that the target engine torque Te* will become not less than the regional upper limit Tul of the initial setting at time tc4 from the increasing trend of the target engine torque Te* at time tc3 and judging that the combustion mode can be switched from the compressed self-ignition type combustion mode to the spark-ignition type combustion mode at a time that is delayed from time tc4 by a time period Δtc based on previously calculated ΔABF.

So far, each embodiment of the present invention has been described in detail, the present invention will not be limited to the above described embodiments and may be subject to various modifications in design within the scope not deviating from the spirit of the invention stated in the claims for patent.

To be more specific, while the air-fuel ratio during the compressed self-ignition type combustion mode is based on the output signal of an air-fuel ratio sensor 9 provided in an appropriate position of an exhaust pipe 8, it may be estimated based on the output signal of an airflow sensor 1, or although not clearly shown in the figure, a sensor for measuring the pressure inside the intake pipe, or a sensor for measuring the temperature of air quantity that flows into the cylinder, or a sensor for measuring atmospheric pressure, or a sensor for measuring engine temperature, or a sensor for measuring the flow rate of the fuel that passes through an injector 3, or a sensor for measuring the pressure to be applied to the fuel to inject the fuel from the injector 3.

As so far described, applying the present invention enables to suppress deterioration of operability such as misfire due to enrichment of air-fuel ratio and to effectively use the fuel saving potential owing to a lean air-fuel ratio by appropriately performing the switching of combustion mode depending on the air-fuel ratio during the compressed self-ignition type combustion mode.

Reference Signs List

1: Airflow sensor, 2: Electronic control throttle, 3: Injector, 4: Ignition plug, 5: Variable valve, 5a: Intake valve, 5b: Exhaust valve, 6: Intake pipe, 7: Cylinder, 8: Exhaust pipe, 9: Air-fuel ratio sensor, 10: Three-way catalyst, 11: Crankshaft, 12: Crank angle sensor, 13: Piston, 20: ECU, 20a: Input circuit, 20b: Input/output port, 20c: RAM, 20d: ROM, 20e: CPU, 20f: Electronic throttle driving circuit, 20g: Injector driving circuit, 20h: Ignition output circuit, 20j: Variable valve driving circuit, 21: Combustion-mode switching determination portion, 21a: Regional upper-limit calculation portion, 21b: Target air-fuel ratio calculation portion, 21c, 21e: Subtraction portion, 21d: Regional upper-limit correction quantity calculation portion, 21f: Combustion mode switching portion, 22: Actuating-quantity calculation portion for spark-ignition type combustion, 23: Actuating-quantity calculation portion for compressed self-ignition type combustion, 24: Combustion mode switching portion, 100: Engine, and 111: Exhaust temperature sensor.

The invention claimed is:

1. A control device for a compressed self-ignition type internal combustion engine, for use in an internal combustion engine having:
an injector for directly injecting fuel into a combustion chamber; and
an ignition device for igniting the fuel injected into the combustion chamber,
the control device for a compressed self-ignition type internal combustion engine being configured such that
a spark-ignition type combustion mode in which fuel sprayed from the injector is ignited by the ignition device to burn the fuel to actuate the internal combustion engine, and a compressed self-ignition type combustion mode, in which the fuel injected from the injector is caused to burn by a pressure rise in association with upward movement of a piston making up the combustion chamber, are switched depending on whether or not the working state of the internal combustion engine is in a compressed self-ignition type combustion region in which the compressed self-ignition type combustion mode is stably performable, which is determined by a torque and an engine rotational speed, and that when an air-fuel ratio which is a mass ratio between an air quantity and a fuel quantity introduced into the combustion chamber while the compressed self-ignition type combustion mode is performed is richer than a predetermined value, an upper limit of torque of the compressed self-ignition type combustion region is changed toward a direction in which the upper limit decreases, and that when the air-fuel ratio is richer than the predetermined value while the compressed self-ignition type combustion mode is performed, and there is a demand for increasing torque to be not less than an upper limit of the compressed self-ignition type combustion region while the compressed self-ignition type combustion mode is performed, the torque is increased in a spark-ignition type combustion mode, after the torque is increased in the compressed self-ignition type combustion mode with a quantity of torque to be increased in the compressed self-ignition type combustion mode being decreased to be less than a quantity of torque to be increased when the air-fuel ratio is the predetermined value with reference to torque before there is the demand for increasing the torque.

2. The control device for a compressed self-ignition type internal combustion engine according to claim 1, wherein
the air-fuel ratio is determined based on an output signal of a sensor for detecting air-fuel ratio, which is provided in the downstream of the exhaust valve.

3. The control device for a compressed self-ignition type internal combustion engine according to claim 1, wherein
the air-fuel ratio is determined based on an output signal of any one of sensors provided in the internal combustion engine, including: a sensor for measuring a flow rate of air passing through an intake pipe; a sensor for measuring pressure in an intake pipe; a sensor for measuring temperature of airflow quantity that flows into the combustion chamber; a sensor for measuring an atmospheric pressure; a sensor for measuring an engine temperature of the internal combustion engine; a sensor for measuring a flow rate of the fuel that flows through the injector; and a sensor for measuring pressure to be applied to the fuel to inject the fuel from the injector.

4. The control device for a compressed self-ignition type internal combustion engine according to claim 1, wherein
when the air-fuel ratio while the compressed self-ignition type combustion mode is performed is leaner than the predetermined value, the upper limit of torque of the compressed self-ignition type combustion region is changed toward a direction in which the upper limit increases.

5. A control device for a compressed self-ignition type internal combustion engine, for use in an internal combustion engine having:
an injector for directly injecting fuel into a combustion chamber; and
an ignition device for igniting the fuel injected into the combustion chamber, the control device for a compressed self-ignition type internal combustion engine being configured such that a spark-ignition type combustion mode in which fuel sprayed from the injector is ignited by the ignition device to burn the fuel to actuate the internal combustion engine, and a compressed self-ignition type combustion mode, in which the fuel injected from the injector is caused to burn by a pressure rise in association with upward movement of a piston making up the combustion chamber, are switched depending on whether or not the working state of the internal combustion engine is in a compressed self-ignition type combustion region in which the compressed self-ignition type combustion mode is stably performable, which is determined by a torque and an engine rotational speed, and that when an air-fuel ratio which is a mass ratio between an air quantity and a fuel quantity introduced into the combustion chamber while the compressed self-ignition type combustion mode is performed is richer than a predetermined value, an upper limit of torque of the compressed self-ignition type combustion region is changed toward a direction in which the upper limit decreases, and that when the air-fuel ratio is leaner than the predetermined value while the compressed self-ignition type combustion mode is performed, and there is a demand for increasing torque to be not less than an upper limit of the compressed self-ignition type combustion region while the compressed self-ignition type combustion mode is performed, torque is increased in the spark-ignition type combustion mode, after torque is increased in the compressed self-ignition type combustion mode with a quantity of torque to be increased in the compressed self-ignition type combustion mode being increased to be more than a quantity of torque to be increased when the air-fuel ratio is the predetermined value with reference to torque before there is the demand for increasing the torque.

6. A control device for a compressed self-ignition type internal combustion engine, for use in an internal combustion engine having:

an injector for directly injecting fuel into a combustion chamber; and an ignition device for igniting the fuel injected into the combustion chamber, the control device for a compressed self-ignition type internal combustion engine being configured such that a spark-ignition type combustion mode in which fuel sprayed from the injector is ignited by the ignition device to burn the fuel to actuate the internal combustion engine, and a compressed self-ignition type combustion mode, in which the fuel injected from the injector is caused to burn by a pressure rise in association with upward movement of a piston making up the combustion chamber, are switched depending on whether or not the working state of the internal combustion engine is in a compressed self-ignition type combustion region in which the compressed self-ignition type combustion mode is stably performable, which is determined by a torque and an engine rotational speed, and that when an air-fuel ratio which is a mass ratio between an air quantity and a fuel quantity introduced into the combustion chamber while the compressed self-ignition type combustion mode is performed is richer than a predetermined value, an upper limit of torque of the compressed self-ignition type combustion region is changed toward a direction in which the upper limit decreases, and that when the air-fuel ratio while the compressed self-ignition type combustion mode is performed is richer than the predetermined value, and there is a demand for increasing torque to be not less than an upper limit of the compressed self-ignition type combustion region while the compressed self-ignition type combustion mode is performed, torque is increased in the spark-ignition type combustion mode, after torque is increased in the compressed self-ignition type combustion mode with a period during which the torque is increased in the compressed self-ignition type combustion mode being reduced with reference to a period during which the compressed self-ignition type combustion mode is continued before there is the demand for increasing torque.

7. A control device for a compressed self-ignition type internal combustion engine, for use in an internal combustion engine having:

an injector for directly injecting fuel into a combustion chamber; and an ignition device for igniting the fuel injected into the combustion chamber, the control device for a compressed self-ignition type internal combustion engine being configured such that a spark-ignition type combustion mode in which fuel sprayed from the injector is ignited by the ignition device to burn the fuel to actuate the internal combustion engine, and a compressed self-ignition type combustion mode, in which the fuel injected from the injector is caused to burn by a pressure rise in association with upward movement of a piston making up the combustion chamber, are switched depending on whether or not the working state of the internal combustion engine is in a compressed self-ignition type combustion region in which the compressed self-ignition type combustion mode is stably performable, which is determined by a torque and an engine rotational speed, and that when an air-fuel ratio which is a mass ratio between an air quantity and a fuel quantity introduced into the combustion chamber while the compressed self-ignition type combustion mode is performed is richer than a predetermined value, an upper limit of torque of the compressed self-ignition type combustion region is changed toward a direction in which the upper limit decreases, and that when the air-fuel ratio is leaner than the predetermined value while the compressed self-ignition type combustion mode is performed, and there is a demand for increasing torque to be not less than an upper limit of the compressed self-ignition type combustion region while the compressed self-ignition type combustion mode is performed, the torque is increased in the spark-ignition type combustion mode, after torque is increased in the compressed self-ignition type combustion mode with a period during which torque is increased in the compressed self-ignition type combustion mode being extended with reference to a period during which the compressed self-ignition type combustion mode is continued before there is the demand for increasing the torque.

* * * * *